US007131073B2

(12) United States Patent
Rosenberg et al.

(10) Patent No.: US 7,131,073 B2
(45) Date of Patent: Oct. 31, 2006

(54) FORCE FEEDBACK APPLICATIONS BASED ON CURSOR ENGAGEMENT WITH GRAPHICAL TARGETS

(75) Inventors: Louis B. Rosenberg, Pleasanton, CA (US); Dean C. Chang, Palo Alto, CA (US)

(73) Assignee: Immersion Corporation, San Jose, CA (US)

( * ) Notice: Subject to any disclaimer, the term of this patent is extended or adjusted under 35 U.S.C. 154(b) by 260 days.

(21) Appl. No.: 09/992,123

(22) Filed: Nov. 13, 2001

(65) Prior Publication Data

US 2002/0050978 A1 May 2, 2002

Related U.S. Application Data

(63) Continuation of application No. 09/590,856, filed on Jun. 8, 2000, now Pat. No. 6,317,116, which is a continuation of application No. 08/879,296, filed on Jun. 18, 1997, now Pat. No. 6,078,308, and a continuation-in-part of application No. 08/756,745, filed on Nov. 26, 1996, now Pat. No. 5,825,308, which is a continuation-in-part of application No. 08/571,606, filed on Dec. 13, 1995, now Pat. No. 6,219,032.

(51) Int. Cl.
*G09G 5/00* (2006.01)

(52) U.S. Cl. .................. 715/856; 715/701; 715/702

(58) Field of Classification Search .............. 345/856, 345/860, 862, 801, 802, 156, 157, 161, 163
See application file for complete search history.

(56) References Cited

U.S. PATENT DOCUMENTS 2,906,179 A 9/1959 Bower 2,972,140 A 2/1961 Hirsch (Continued)

FOREIGN PATENT DOCUMENTS

EP 0265011 A1 4/1988

(Continued)

OTHER PUBLICATIONS

Baigrie, "Electric Control Loading—A Low Cost, High Performance Alternative," *Proceedings of Interservice/Industry Training Systems Conference*, pp. 247-254, Nov. 6-8, 1990.

(Continued)

*Primary Examiner*—Kent Chang
(74) *Attorney, Agent, or Firm*—Thelen Reid & Priest LLP; David B. Ritchie

(57) ABSTRACT

A method and apparatus for providing a click surface in a graphical environment, such as a graphical user interface, implemented on a host computer for use with a force feedback interface device. A displayed cursor is controlled by a user-moveable user object, such as a mouse, of the interface device. A click surface is displayed with an associated graphical object, such as a graphical button or an edge of a window, icon, or other object. When the click surface is contacted by the cursor, a force is output opposing movement of the user object in a direction into the click surface and into the graphical object. When the user object has moved to or past a trigger position past the contact with the click surface, a command gesture signal is provided to the host computer indicating that the graphical object has been selected as if a physical input device on the user object, such as a button, has been activated by the user. Preferably, the host computer displays the graphical environment including the click surface and cursor, while a microprocessor local to the interface device controls the force output of the click surface in parallel with the host display.

21 Claims, 7 Drawing Sheets

U.S. PATENT DOCUMENTS

| | | |
|---|---|---|
| 3,157,853 A | 11/1964 | Hirsch |
| 3,220,121 A | 11/1965 | Cutler |
| 3,490,059 A | 1/1970 | Paulsen et al. |
| 3,497,668 A | 2/1970 | Hirsch |
| 3,517,446 A | 6/1970 | Corlyon et al. |
| 3,531,868 A | 10/1970 | Stevenson |
| 3,623,064 A | 11/1971 | Kagan |
| 3,890,958 A | 6/1975 | Fister et al. |
| 3,902,687 A | 9/1975 | Hightower |
| 3,903,614 A | 9/1975 | Diamond et al. |
| 3,911,416 A | 10/1975 | Feder |
| 3,919,691 A | 11/1975 | Noll |
| 3,944,798 A | 3/1976 | Eaton |
| 4,114,882 A | 9/1978 | Mau |
| 4,125,800 A | 11/1978 | Jones |
| 4,127,752 A | 11/1978 | Lowthorp |
| 4,148,014 A | 4/1979 | Burson |
| 4,160,508 A | 7/1979 | Frosch et al. |
| 4,216,467 A | 8/1980 | Colston |
| 4,236,325 A | 12/1980 | Hall et al. |
| 4,262,549 A | 4/1981 | Schwellenbach |
| 4,333,070 A | 6/1982 | Barnes |
| 4,398,889 A | 8/1983 | Lam et al. |
| 4,448,083 A | 5/1984 | Hayashi |
| 4,464,117 A | 8/1984 | Foerst |
| 4,477,043 A | 10/1984 | Repperger |
| 4,477,973 A | 10/1984 | Davies |
| 4,484,191 A | 11/1984 | Vavra |
| 4,513,235 A | 4/1985 | Acklam et al. |
| 4,550,221 A | 10/1985 | Mabusth |
| 4,550,617 A | 11/1985 | Fraignier et al. |
| 4,571,834 A | 2/1986 | Fraser et al. |
| 4,581,491 A | 4/1986 | Boothroyd |
| 4,593,470 A | 6/1986 | Davies |
| 4,599,070 A | 7/1986 | Hladky et al. |
| 4,601,206 A | 7/1986 | Watson |
| 4,604,016 A | 8/1986 | Joyce |
| 4,632,341 A | 12/1986 | Repperger et al. |
| 4,638,798 A | 1/1987 | Shelden et al. |
| 4,653,011 A | 3/1987 | Iwano |
| 4,654,648 A | 3/1987 | Herrington et al. |
| 4,676,002 A | 6/1987 | Slocum |
| 4,679,331 A | 7/1987 | Koontz |
| 4,688,983 A | 8/1987 | Lindbom |
| 4,689,449 A | 8/1987 | Rosen |
| 4,692,756 A | 9/1987 | Clark |
| 4,703,443 A | 10/1987 | Moriyasu |
| 4,704,909 A | 11/1987 | Grahn et al. |
| 4,708,656 A | 11/1987 | de Vries et al. |
| 4,713,007 A | 12/1987 | Alban |
| 4,734,685 A | 3/1988 | Watanabe |
| 4,750,487 A | 6/1988 | Zanetti |
| 4,769,763 A | 9/1988 | Trieb et al. |
| 4,775,289 A | 10/1988 | Kazerooni |
| 4,782,327 A | 11/1988 | Kley et al. |
| 4,787,051 A | 11/1988 | Olson |
| 4,791,934 A | 12/1988 | Brunnett |
| 4,794,392 A | 12/1988 | Selinko |
| 4,798,919 A | 1/1989 | Miessler et al. |
| 4,800,721 A | 1/1989 | Cemenska et al. |
| 4,803,413 A | 2/1989 | Kendig et al. |
| 4,811,608 A | 3/1989 | Hilton |
| 4,819,195 A | 4/1989 | Bell et al. |
| 4,839,838 A | 6/1989 | LaBiche et al. |
| 4,849,692 A | 7/1989 | Blood |
| 4,868,549 A | 9/1989 | Affinito et al. |
| 4,879,556 A | 11/1989 | Duimel |
| 4,885,565 A | 12/1989 | Embach |
| 4,888,877 A | 12/1989 | Enderle et al. |
| 4,891,764 A | 1/1990 | McIntosh |
| 4,891,889 A | 1/1990 | Tomelleri |
| 4,907,970 A | 3/1990 | Meenen, Jr. |
| 4,907,973 A | 3/1990 | Hon |
| 4,930,770 A | 6/1990 | Baker |
| 4,934,694 A | 6/1990 | McIntosh |
| 4,935,728 A | 6/1990 | Kley |
| 4,942,545 A | 7/1990 | Sapia |
| 4,945,305 A | 7/1990 | Blood |
| 4,945,501 A | 7/1990 | Bell et al. |
| 4,961,138 A | 10/1990 | Gorniak |
| 4,961,267 A | 10/1990 | Herzog |
| 4,962,591 A | 10/1990 | Zeller et al. |
| 4,982,504 A | 1/1991 | Soderberg et al. |
| 4,982,618 A | 1/1991 | Culver |
| 4,983,786 A | 1/1991 | Stevens David R. et al. |
| 5,007,085 A | 4/1991 | Greanias et al. |
| 5,007,300 A | 4/1991 | Siva |
| 5,019,761 A | 5/1991 | Kraft |
| 5,022,384 A | 6/1991 | Freels et al. |
| 5,022,407 A | 6/1991 | Horch et al. |
| 5,035,242 A | 7/1991 | Franklin et al. |
| 5,038,089 A | 8/1991 | Szakaly |
| 5,040,306 A | 8/1991 | McMurtry et al. |
| 5,044,956 A | 9/1991 | Behensky et al. |
| 5,050,608 A | 9/1991 | Watanabe et al. |
| 5,065,145 A | 11/1991 | Purcell |
| 5,072,361 A | 12/1991 | Davis et al. |
| 5,078,152 A | 1/1992 | Bond et al. |
| 5,080,377 A | 1/1992 | Stamper et al. |
| 5,088,046 A | 2/1992 | McMurtry |
| 5,088,055 A | 2/1992 | Oyama |
| 5,095,303 A | 3/1992 | Clark et al. |
| 5,103,404 A | 4/1992 | McIntosh |
| 5,107,080 A | 4/1992 | Rosen |
| 5,107,262 A | 4/1992 | Cadoz et al. |
| 5,116,051 A | 5/1992 | Moncrief et al. |
| 5,126,948 A | 6/1992 | Mitchell et al. |
| 5,128,671 A | 7/1992 | Thomas, Jr. |
| 5,131,844 A | 7/1992 | Marinaccio et al. |
| 5,132,672 A | 7/1992 | Clark |
| 5,139,261 A | 8/1992 | Openiano |
| 5,142,506 A | 8/1992 | Edwards |
| 5,142,931 A | 9/1992 | Menahem |
| 5,143,505 A | 9/1992 | Burdea et al. |
| 5,146,566 A | 9/1992 | Hollis, Jr. et al. |
| 5,148,377 A | 9/1992 | McDonald |
| 5,165,897 A | 11/1992 | Johnson |
| 5,175,459 A | 12/1992 | Danial et al. |
| 5,178,012 A | 1/1993 | Culp |
| 5,181,181 A | 1/1993 | Glynn |
| 5,182,557 A | 1/1993 | Lang |
| 5,184,306 A | 2/1993 | Erdman et al. |
| 5,184,319 A | 2/1993 | Kramer |
| 5,185,561 A | 2/1993 | Good et al. |
| 5,186,629 A * | 2/1993 | Rohen ................ 340/825.19 |
| 5,186,695 A | 2/1993 | Mangseth et al. |
| 5,187,874 A | 2/1993 | Takahashi et al. |
| 5,189,806 A | 3/1993 | McMurtry et al. |
| 5,193,963 A | 3/1993 | McAffee et al. |
| 5,195,179 A | 3/1993 | Tokunaga |
| 5,204,824 A | 4/1993 | Fujimaki |
| 5,209,131 A | 5/1993 | Baxter |
| 5,212,473 A | 5/1993 | Louis |
| 5,220,260 A | 6/1993 | Schuler |
| 5,223,776 A | 6/1993 | Radke et al. |
| 5,228,356 A | 7/1993 | Chuang |
| 5,230,623 A | 7/1993 | Guthrie et al. |
| 5,235,868 A | 8/1993 | Culver |
| 5,240,417 A | 8/1993 | Smithson et al. |
| 5,243,266 A | 9/1993 | Kasagami et al. |
| 5,251,127 A | 10/1993 | Raab |
| 5,251,156 A | 10/1993 | Heier et al. |
| 5,259,120 A | 11/1993 | Chapman et al. |
| 5,259,894 A | 11/1993 | Sampson |

| Patent No. | Date | Inventor |
|---|---|---|
| 5,262,777 A | 11/1993 | Low et al. |
| 5,264,768 A | 11/1993 | Gregory |
| 5,271,290 A | 12/1993 | Fischer |
| 5,275,174 A | 1/1994 | Cook |
| 5,275,565 A | 1/1994 | Moncrief |
| 5,283,070 A | 2/1994 | Bertrand et al. |
| 5,290,276 A | 3/1994 | Sewell, Jr. |
| 5,296,846 A | 3/1994 | Ledley |
| 5,296,871 A | 3/1994 | Paley |
| 5,298,890 A | 3/1994 | Kanamaru et al. |
| 5,299,810 A | 4/1994 | Pierce et al. |
| 5,309,140 A | 5/1994 | Everett, Jr. et al. |
| 5,313,230 A | 5/1994 | Venolia et al. |
| 5,334,027 A | 8/1994 | Wherlock |
| 5,351,692 A | 10/1994 | Dow et al. |
| 5,354,162 A | 10/1994 | Burdea et al. |
| 5,355,148 A | 10/1994 | Anderson |
| 5,374,942 A | 12/1994 | Gilligan et al. |
| 5,379,663 A | 1/1995 | Hara |
| 5,384,460 A | 1/1995 | Tseng |
| 5,386,507 A | 1/1995 | Teig et al. |
| 5,389,865 A | 2/1995 | Jacobus et al. |
| 5,396,266 A | 3/1995 | Brimhall |
| 5,396,267 A | 3/1995 | Bouton |
| 5,397,232 A | 3/1995 | Nishimura |
| 5,397,323 A | 3/1995 | Taylor et al. |
| 5,398,044 A | 3/1995 | Hill |
| 5,402,582 A | 4/1995 | Raab |
| 5,405,152 A | 4/1995 | Katanics et al. |
| 5,412,880 A | 5/1995 | Raab |
| 5,414,337 A | 5/1995 | Schuler |
| 5,417,696 A | 5/1995 | Kashuba et al. |
| 5,428,748 A | 6/1995 | Davidson et al. |
| 5,429,140 A | 7/1995 | Burdea et al. |
| 5,435,554 A | 7/1995 | Lipson |
| 5,436,542 A | 7/1995 | Petelin et al. |
| 5,436,622 A | 7/1995 | Gutman et al. |
| 5,436,638 A | 7/1995 | Bolas et al. |
| 5,436,640 A | 7/1995 | Reeves |
| 5,445,166 A | 8/1995 | Taylor |
| 5,451,924 A | 9/1995 | Massimino et al. |
| 5,457,479 A | 10/1995 | Cheng |
| 5,459,382 A | 10/1995 | Jacobus et al. |
| 5,466,213 A | 11/1995 | Hogan et al. |
| 5,467,763 A | 11/1995 | McMahon et al. |
| 5,471,571 A | 11/1995 | Smith et al. |
| 5,477,237 A | 12/1995 | Parks |
| 5,482,051 A | 1/1996 | Reddy et al. |
| 5,491,477 A | 2/1996 | Clark et al. |
| 5,512,919 A | 4/1996 | Araki |
| 5,513,100 A | 4/1996 | Parker et al. |
| 5,526,480 A | 6/1996 | Gibson |
| 5,530,455 A | 6/1996 | Gillick et al. |
| 5,547,382 A | 8/1996 | Yamasaki et al. |
| 5,565,840 A | 10/1996 | Thorner et al. |
| 5,565,887 A | 10/1996 | McCambridge et al. |
| 5,565,888 A | 10/1996 | Selker |
| 5,570,111 A | 10/1996 | Barrett et al. |
| 5,575,761 A | 11/1996 | Hajianpour |
| 5,576,727 A | 11/1996 | Rosenberg et al. |
| 5,577,981 A | 11/1996 | Jarvik |
| 5,583,478 A | 12/1996 | Renzi |
| 5,587,937 A | 12/1996 | Massie et al. |
| 5,589,828 A | 12/1996 | Armstrong |
| 5,589,854 A | 12/1996 | Tsai |
| 5,591,924 A | 1/1997 | Hilton |
| 5,596,347 A | 1/1997 | Robertson et al. |
| 5,619,180 A | 4/1997 | Massimino et al. |
| 5,623,582 A | 4/1997 | Rosenberg |
| 5,623,641 A | 4/1997 | Kadoyashiki |
| 5,625,576 A | 4/1997 | Massie et al. |
| 5,629,594 A | 5/1997 | Jacobus et al. |
| 5,631,861 A | 5/1997 | Kramer |
| 5,642,469 A | 6/1997 | Hannaford et al. |
| 5,643,087 A | 7/1997 | Marcus et al. |
| 5,666,138 A | 9/1997 | Culver |
| 5,666,473 A | 9/1997 | Wallace |
| 5,690,582 A | 11/1997 | Ulrich et al. |
| 5,691,747 A | 11/1997 | Amano |
| 5,691,898 A | 11/1997 | Rosenberg et al. |
| 5,694,013 A | 12/1997 | Stewart et al. |
| 5,709,219 A | 1/1998 | Chen et al. |
| 5,714,978 A * | 2/1998 | Yamanaka et al. .......... 345/157 |
| 5,721,566 A | 2/1998 | Rosenberg et al. |
| 5,731,804 A | 3/1998 | Rosenberg |
| 5,734,373 A | 3/1998 | Rosenberg et al. |
| 5,736,978 A | 4/1998 | Hasser et al. |
| 5,737,607 A | 4/1998 | Hamilton et al. |
| 5,739,811 A | 4/1998 | Rosenberg et al. |
| 5,742,278 A | 4/1998 | Chen et al. |
| 5,745,715 A | 4/1998 | Pickover et al. |
| 5,754,023 A | 5/1998 | Roston et al. |
| 5,755,577 A | 5/1998 | Gillio |
| 5,757,358 A | 5/1998 | Osga |
| 5,766,016 A | 6/1998 | Sinclair et al. |
| 5,767,839 A | 6/1998 | Rosenberg |
| 5,771,037 A | 6/1998 | Jackson |
| 5,781,172 A | 7/1998 | Engel et al. |
| 5,784,052 A | 7/1998 | Keyson |
| 5,785,630 A | 7/1998 | Bobick et al. |
| 5,786,818 A | 7/1998 | Brewer et al. |
| 5,790,108 A | 8/1998 | Salcudean et al. |
| 5,802,353 A | 9/1998 | Avila et al. |
| 5,805,140 A | 9/1998 | Rosenberg et al. |
| 5,805,165 A | 9/1998 | Thorne, III et al. |
| 5,808,601 A | 9/1998 | Leah et al. |
| 5,818,423 A | 10/1998 | Pugliese et al. |
| 5,825,308 A | 10/1998 | Rosenberg |
| 5,844,392 A | 12/1998 | Peurach et al. |
| 5,877,748 A | 3/1999 | Redlich |
| 5,889,670 A | 3/1999 | Schuler et al. |
| 5,914,716 A | 6/1999 | Rubin et al. |
| 5,956,484 A | 9/1999 | Rosenberg et al. |
| 5,959,613 A | 9/1999 | Rosenberg et al. |
| 5,973,670 A * | 10/1999 | Barber et al. ................ 345/157 |
| 5,990,869 A | 11/1999 | Kubica et al. |
| 6,004,134 A * | 12/1999 | Marcus et al. ............... 345/161 |
| 6,020,876 A | 2/2000 | Rosenberg et al. |
| 6,028,593 A | 2/2000 | Rosenberg et al. |
| 6,046,726 A * | 4/2000 | Keyson ....................... 345/156 |
| 6,057,828 A | 5/2000 | Rosenberg et al. |
| 6,061,004 A | 5/2000 | Rosenberg |
| 6,078,308 A | 6/2000 | Rosenberg et al. |
| 6,084,587 A | 7/2000 | Tarr et al. |
| 6,088,019 A | 7/2000 | Rosenberg |
| 6,111,562 A | 8/2000 | Downs et al. |
| 6,111,577 A | 8/2000 | Zilles et al. |
| 6,131,097 A | 10/2000 | Peurach et al. |
| 6,160,489 A | 12/2000 | Perry et al. |
| 6,326,964 B1 | 12/2001 | Snyder et al. |
| 6,422,941 B1 | 7/2002 | Thorner et al. |

FOREIGN PATENT DOCUMENTS

| | | |
|---|---|---|
| EP | 0 349 086 A1 | 1/1990 |
| EP | 0607580 A1 | 7/1994 |
| GB | 2254911 A | 10/1992 |
| JP | H2-185278 | 7/1990 |
| JP | H4-8381 | 1/1992 |
| JP | 4-34610 | 2/1992 |
| JP | H5-192449 | 8/1993 |
| JP | H7-24147 | 1/1995 |
| WO | WO 9200559 | 1/1992 |
| WO | WO 026634 A2 | 11/1994 |
| WO | WO 9502233 | 1/1995 |
| WO | WO 9502801 | 1/1995 |

| WO | WO 9520787 | 8/1995 |
| WO | WO 9520788 | 8/1995 |
| WO | WO 9532459 | 11/1995 |
| WO | WO 9616397 | 5/1996 |
| WO | WO 9622591 | 7/1996 |
| WO | WO 9628777 | 9/1996 |
| WO | WO 9642078 | 12/1996 |
| WO | WO 97/12357 | 4/1997 |
| WO | WO 97/19440 | 5/1997 |
| WO | WO 9720305 | 6/1997 |
| WO | WO 9731333 | 8/1997 |

OTHER PUBLICATIONS

Iwata, "Pen-based Haptic Virtual Environment," 0-7803-1363-1/93 IEEE, pp. 287-292, 1993.

Russo, "The Design and Implementation of a Three Degree of Freedom Force Output Joystick," MIT Libraries Archives pp. 1-131, May 1990, archived Aug. 14, 1990.

Brooks et al., "Hand Controllers for Teleoperation—a State-of-the Art Technology Survey and Evaluation," *JPL Publication 85-11*, NASA-CR-175890; N85-28559, pp. 1-84, Mar. 1,1985.

Jones et al., "A perceptual analysis of stiffness," ISSN 0014-4819 Springer International (Springer Verlag); *Experimental Brain Research*, vol. 79, No. 1, pp. 150-156, 1990.

Burdea et al., "Distributed Virtual Force Feedback, Lecture Notes for Workshop on Force Display in Virtual Environments and its Aplication to Robotic Teleoperation," *1993 IEEE International Conferece on Robotics and Automation*, pp. 25-44, May 2, 1993.

Snow et al., Model-X Force-Reflecting-Hand-Controller, NT Control No. NPO-17851; JPL Case No. 7348, pp. 1-4 with 45 page4s of attachments, Jun. 15, 1989.

Ouh-Young, "Force Display in Molecular Docking," Doctoral Dissertation, University of North Carolina at Chapel Hill, UMI Order No. 9034744, p. 1-369, 1990.

Tadros, "Control System Design for a Three Degree of Freedom Virtual Envrionment Simulator Using Motor/Brake Pair Actuators," *MIT Archive*, pp. 1-88, Feb. 1990, archived Aug. 13, 1990.

Caldwell et al., "Enhanced Tactile Feedback (Tele-Tacion) Using a Multi-Functional Sensory System," 1050-4729/93, pp. 955-960, 1993.

Adelstein et al., "Design and Implementation of a Force Reflecting Manipulandum for Manual Control research," DSC-vol. 42, *Advances in Robotics*, pp. 1-12, 1992.

Gotow et al., "Controlled Impedance Test Apparatus for Studying Human Interpretation of Kinesthetic Feedback," WA11-11:00, pp. 332-337.

Stanley et al., "Computer Simulation of Interacting Dynamic Mechanical Systems Using Distributed Memory Parallel Processors," DSC-vol. 42, *Advances in Robotics*, pp. 55-61, ASME 1992.

Russo, "Controlling Dissipative Magnetic Particle Brakes in Force Reflective Devices," DSC-vol. 42, *Advances in Robotics*, pp. 63-70, ASME 1992.

Kontarinis et al., "Display of High-Frequency Tactile Information to Teleoperators," *Telemanipulator Technology and Space Telerobotics*, Won S. Kim, Editor, Proc. SPIE vol. 2057, pp. 40-50, Sep. 7-9, 1993.

Patrick et al., "Design and Testing of A Non-reactive, Fingertip, Tactile Display for Interaction with Remote Environments," *Cooperative Intelligent Robotics in Space*, Rui J. deFigueiredo et al, Editor, Proc. SPIE vol. 1387, pp. 215-222, 1990.

Adelstein, "A Virtual Environment System For The Study of Human Arm Tremor," *Ph.D. Dissertation*, Dept. of Mechanical Engineering, MIT, Jun. 1989, archived Mar. 13, 1990.

Bejczy, "Sensor, Controls, and Man-Machine Interface for Advanced Teleoperation," *Science*, vol. 208, No. 4450, pp. 1327-1335, 1980.

Bejczy et al., "Generalization of Bilateral Force-Reflecting Control of Manipulators," *Proceedings of Fourth CISM-IFToMM*, Sep. 8-12, 1981.

McAffee et al., "Teleoperator Subsystem/Telerobot Demonstrator: Force Reflecting Hand Controller Equipment Manual,"*JPL* 1988, JPL D-5172.

Minsky, "Computtation Haptics: The Sandpaper System for Synthesizing Texture for a Force-Feedback Display," *Ph.D. Dissertation*, MIT, Jun. 1995, archived Jul. 6, 1995.

Jacobson et al., "High Performance, Dextrous Telerobotic Manipulator With Force Reflection," *Intervention/ROV '91 Conference & Exposition*, Hollywood, Florida, May 21-23, 1991.

Shimoga, "Finger Force and Touch Feedback Issues in Dexterous Telemanipulation," *Proceedings of Fourth Annual Conference on Intelligent Robotic Systems for Space Exploration*, Rensselaer Polytechnic Institute, Sep. 30-Oct. 1, 1992.

IBM Technical Disclosure Bulletin, "Mouse Ball-Actuating Device With Force and Tectile Feedback," vol. 32, No. 9B, Feb. 1990.

Terry et al., "Tactile Feedback In A Computer Mouse," *Proceedings of Fourteenth Annual Northeast Bioengineering Conference, University of New Hampshire*, Mar. 10-11, 1998.

Howe, "A Force-Reflecting Teleoperated Hand System for the Study of Tactile Sensing in Precision Manipulation," *Proceedings of the 1992 IEEE International Conference on Robotics and Automation*, Nice, France, May 1992.

Eberhardt et al., "OMAR—A Haptic display for speech perception by deaf and deaf-blind individual," *IEEE Virtual Reality Annual International Symposium*, Seattle, WA, Sep. 18-22, 1993.

Rabinowitz et al., "Multidimensional tactile displays: Identification of vibratory intensity, frequency, and contractor area," *Journal of The Acoustical Society of America*, vol. 82, No. 4, Oct. 1987.

Bejczy et al., "Kinesthetic Coupling Between Operator and Remote Manipulator," *International Computer Technology Conference, The American Society of Mechanical Engineers*, San Francisco, CA, Aug. 12-15, 1980.

Bejczy et al., "A Laboratory Breadboard System For Dual-Arm Teleoperation," *SOAR '89 Workshop, JSC*, Houston, TX, Jul. 25-27, 1989.

Ouhyoung et al., "A Low-Cost Force Feedback Joystick and Its Use in PC Video Gmaes," *IEEE Transactions on Consumer Electronics*, vol. 41, No. 3, Aug. 1995.

Marcus, "Touch Feedback in Surgery," *Proceedings of Virtual Reality and Medicine The Cutting Edge*, Sep. 8-11, 1994.

Bejczy, et al., "Universal Computer Control System (UCCS) For Space Telerobots," CH2413-3/87/0000/0318501.00 1987 IEEE, 1987.

Patrick, "Design, Construction, and Testing of a Fingertip Tactile Display for Interaction with Virtual and Remote Enviroments," *Master of Science Thesis*, MIT, Aug. 1990, archived Nov. 8, 1990.

Calder, "Design of A Force-Feedback Touch-Introducing Actuator For Teleoperator Robot Control," *Bachelor of Science Thesis*, MIT, May 1983, archived Jun. 23, 1983.

Wiker, "Teletouch Display Development Phase 1 Report," *Technical Report 1230*, Naval Ocean Systems Center, San Diego, Jul. 1988.

Bliss, "Optical-to-Tactile Image Conversion for the Blind," *IEEE Transactions on Man-Machine Systems*, vol. MMS-11, No. 1, Mar. 1970.

Johnson, "Shape-Memory Alloy Tactile Feedback Actuator," *Armstrong Aerospace Medical Research Laboratory*, AAMRL-TR-90-039, Aug., 1990.

Kontarinis et al., "Tactile Display of Vibratory Information in Teleoperation and Virtual Environments ," Presence, 4(4):387-402, Harvard Univ., 1995.

Aukstakalnis et al., "Silicon Mirage: The Art and Science of Virtual Reality," ISBN 0-938151-82-7, pp. 129-180, 1992.

Eberhardt et al., "Introducing Dynamic Haptic Perception by The Hand: System Description and Some Results," DSC-vol. 55-1, *Dynamic Systems and Control*: vol. 1, ASME 1994.

Gobel et al., "Tactile Feedback Applied to Computer Mice," *International Journal of Human-Computer Interaction*, vol. 7, No. 1, pp. 1-24, 1995.

Pimentel et al., "Virtual Reality: through the new looking glass," 2nd Edition; McGraw-Hill, ISBN 0-07-050167-X, pp. 41-202, 1994.

"Cyberman Technical Specification," *Logitech Cyberman SWIFT Supplement to Logitech Mouse Technical Reference and Programming Guide*, Arp. 5, 1994.

Ouhyoung et al., "The Development of A Low-Cost Force Feedback Joystick and Its Use in the Virtual Reality Graphics Environment,"

*Proceedings of the Third Pacific Conference on Computer Graphics and Applications, Pacific Graphics '95*, Seoul, Korea, Aug. 21-24, 1995.

Kaczmarek et al., "Tactile Displays," *Virtual Environment Technologies*, Chap. 9, pp. 349-414.

Lake. "Cyberman from Logitech," at http://www.ibiblio.org/ GameBytes/issue21/ greviews/cyberman.html, 1994.

"Component Maintance Manual With Illustrated Parts List, Coaxial Control Shaker Part. No. C-25502," Safe Flight Instrument Corporation, Revised Jan. 28, 2002 (3 pages).

"Technical Manual Ovehaul Instruction With Parts Breakdown, Coaxial Control Shaker Part No. C-25502," Safe Flight Instrument Corporation, Revised Jul. 15, 1980 (23 pages).

Scannell, "Taking a Joystick Ride," *Computer Currents*, Boston Edition, vol. 9, No. 11, Nov. 1994.

Yamakita et al., "Tele-Virtual Reality of Dynamic Mechanical Model," *Proceedings of the 1992 IEEE/RSJ International Conference on Intelligent Robots and Systems*, Raleigh, NC, Jul. 7-10, 1992.

Noll, "Man-Machine Tactile," *SID Journal*, Jul./Aug. 1972 Issue.

Rosenberg, "Virtual Fixtures: Perceptual Overlays Enhance Operator Performance in Telepresence Tasks," *Ph.D. Dissertation*, Standford University, Jun. 1994.

"Foot-Operated Mouse," IBM Technical Disclosure Bulletin, Apr. 1986, vol. 28, No. 11.

"High Peformance Model of the Immersion Probe," Immersion-Probe-MD™, Immersion Human Interface Coporation.

"Proceedings of the IFIP Congress 65," International Federation for Information Processing, Information Processing 1965, vol. 3, New York, May 24-29, pp. 506.

"the Personal Digitizer™," Immersion Human Interface Corporation 1994.

"Useful Technology for Your Idea File," Design News, Mar. 7, 1994. pp. 63.

3D Human Interface Tool, Immersion Probe™, Immersion Human Interface Corporation 1994.

Adachi, Yohshitaka et al., "Sensory Evaluation of Virtual Haptic Push-Buttons," Technical Research Center, Suzuki Motor Corporation Motor Corporation, Nov. 1994.

Adelstein Bernard D. et al., "A High Performance Two Degree-of-Freedom Kinesthetic Interface," Massachusetts Institute of Technology 1992, pp. 108-112.

Akamatsu et al., "Multimodal Mouse: A Mouse-Type Device with Tactile and Force Display", Presence, vol. 3, No. 1, Winter 1994, pp. 73-80.

Aldstein Bernard D. et al., "Design and Implementation of a Force Reflecting Manipulandum for Manual Control Research," 1992, pp. 1-24.

Ansley, D., "Thimble gets in touch with reality," New Scientist, 1994, p. 19.

Atkinson, William D. et al., "Computing with Feeling," Comput. & Graphics, vol. 2, No. 2-E, pp. 97-103.

Batter, James J. et al., "grope-1: A Computer Display to the Sense of Feel," pp. TA-a-188-Ta-4-192.

Bejczy, Anatal K., "The Phantom Robot: Predictive Displays for Teleoperation with Time Delay," IEEE 1990, pp. 546-550.

Brooks, F. et al., "project GROPE-Haptic Displays for Scientific Visualization," Computer Graphics, vol. 24, No. 4, Aug. 1990, pp. 177-185.

Burdea, Grigore et al., "A Portable Dextrous Master with Force Feedback," Presence: Teleoperations and Virtual Environments, MIT Press, Jun. 1991.

Burdea, Grigore et al., "Dextrous Telerobotics with Force Feedbacks-An Overview," Robotica 1991, vol. 9.

Buttolo, Pietro et al., "Pen-Based Force Display for Precision Manipulation in Virtual Environments," IEEE Mar. 1995, pp. 1-8.

Buttolo, Pietro, "Hard Disk Actuators for Mini Teleoperation", Proceedings SPIE, Telemanipulator and Telepresence Technologies, Symposium, pp. 55-61, Boston, Oct. 31, 1994.

Colgate, J. Edward et al., "Implementation of Stiff Virtual walls in Force-Reflecting Interfaces," 1993, pp. 1-9.

Ellis, R. E. et al., "Design and Evaluation of a High-Performance Prototype Planar Haptic Interface," ASME Dec. 3, 1993, Dsc-vol. 49, pp. 55-65.

Fischer, Patrick et al., "Specification and Design of Input devices for Teleoperation," 1990.

Fisher, S.S. et al., "Virtual Environment Display System," ACM Interactive 3D Graphics, oct. 1986.

Gotow, J.K., et al., "Perception of Mechanical Properties at the Man-Machine Interface," IEEE 1987, pp. 688-689.

Hannaford, B. et al., "Force Feedback Cursor Control ," NASA Tech Brief, vol. 13, No. 11, Item #21, 1989, pp. i, 1-4.

Hannaford, Blake et al., "Perfromance Evaluation of a Six-Axis Generalized Force-Reflecting Teleoperator," IEEE May/Jun. 1991, vol. 21, No. 3, pp. 620-633.

Hasser, Christopher John, "Tactile Feedback for a Force-Reflecting Haptic Display," The School of Engineering, University of Dayton, Dec. 1995, pp. iii-xii & 1-96.

Herndon, J.N. et al., "The State-of-the-Art Model M-s Maintence System," Proceedings of the 1984 National Topical Meeting on Robotics and remote Handling in Hostile Environments, American Nuclear Society, pp. 59-65.

Hirota, K., "Development of Surface Display", IEEE 0-7803-1363, 1993, pp. 256-262.

Howe, Robert D., "Task Performance with a Dextrous Teleoperated hand System," Proceedings of SPIE, Nov. 1992, vol. 1833, pp. 1-9.

Iwata, H."Artificial Reality with Force-feedback: Development of Desktop Virtual Space with Compact Master Manipulator", Computer Graphics, vol. 24, No. 4, Aug. 1990, pp. 165-170.

Iwata, Hiroo et al., Volume Hapitzation, IEEE 1993, pp. 16-18.

Iwata, Hiroo, "Pen-based Haptic Virtual Environment," Institute of engineering Mechanics, University of Tsukuba, Japan, pp. 287-292.

Jacobsen, S.C. et al., "High Performance, High Dexterity, Force Reflective Teleoperator II,"ANS Topical Meeting on Robotics & Remote Systems, Albuquerque, New Mexico Feb. 24-27, 1991, pp. 1-10.

Jones, L.A., et al., "A Perceptual Analysis of Stiffness," Experimental Brain Research 1990, pp. 151-156.

Kelley et al., "On the Development of a Force-Feedback Mouse and Its Integration in to a Graphical User Interface," 1994 Int'l Mechanical Engineering Congress and Exhibition, Chicago, Nov. 1994.

Kelley, A.J. et al., "MagicMouse: Tactile and Kinesthetic Feedback in the Human-Computer Interface using an Electromagnetically Actuated Input/Output Device," univ. of British Columbia, Dept. of Electrical Engineering Tech, Report, 1993, pp. 1-27.

Kilpatrick, P., "The Use of a Kinesthetic Supplement in an Interactive Graphics System", Univ. of North Carolina, 1976.

Kim, Won S. et al., "Graphics Displays for Operator Aid in Telemanipulation," IEEE 1991, pp. 1059-1067.

Kim, Won S. et al., A Teleoperation training Simulator with Visual and Kinesthetic Force Virtual Reality.

Kotoku, Tetsuo et al., "Environment Modeling for the Interactive Display (EMID) Used in Telerobotic Systems," IEEE Nov. 3-5, 1991, pp. 99-1004.

Kotoku, Tetsuo, "A Predictive Display with Force Feedback and its Application to Remote Manipulation System with Transmission Time Display," IEEE 1992. Jul. 7-10, 1992, pp. 239-246.

Krishna Roy, "Virtual Presence Takes Surgeons through the Virtual Keyhole to Hone Their Skills", Business & Industry, Jul. 4, 1995.

Meyer, Kenneth et al., "A Survey of Position Trackers," The Massachusetts Institute of Technology 1992, Presence, vol. 1, No. 2.

Millman, P., "Design of a Four Degree-of-freedom Force-Reflecting Manipulation witha a Specified Force/Torque Workspace," Proc. of the 1991 IEEE Int'l Conf. on Robotics and Automation, 1991, pp. 1488-1493.

Minsky, Margaret et al., "Feeling and Seeing: Issues in Force Display," ACM 1990, pp. 235-242.

Munch, S. et al., "Intelligent Control for Haptic Displays," Eurographics '96, vol. 15, No. 3, Blackwell Publishers, 1996, pp. 217-226.

Noll, A. Michael, "Ma-Machine Tactile Communication Dissertation,"Polytechnic Institute of Brooklyn, Jun. 1971, pp. 1-88.

Ouh-Young, M. et al., "Creating an Illusion of Feel: Control Issues in Force Display," Computer Science Dept. Univ. of N. Carolina, 1989, pp. 1-14.

Ouh-Young, Ming et al., "Force Display Performs Better than Virtual display in a Simple 6-D Docking Task," IEEE 1989, pp. 1462-1466.

Ouh-Young, Ming et al., "Using A Manipulator for Force Display in Molecular Docking," IEEE 1988, pp. 1824-1829.

Ouh-Young, Ming, "Force Display in Molecular Docking" Chapel Hill 1990, pp. 1-85.

Payette, J et al., "Evaluation fo a Force Feedback (Haptic) Computer Pointing Device in Zero Gravity," DSC-vol. 58, Proc. of ASME Dynamics Systems, ASM 1996, pp.547-553.

Ramstein, C. et al., "The Pantograph: A Large Workspace Haptic Device for a Multimodal Human-Computer Interaction," Computer-Human Interaciton, CHI '94, 1994.

Ramstein, C., "Combining Haptic and Braille Technologies: Design Issues and Pilot Study," Assests '96, ACM 0-89791-776-6, 1996, pp. 37-44.

Rosenberg, "Using Force Feedback to Enhance Human Performance in Graphical User Interfaces", Apr. 1996, www.acm.org./sigch/ch;96.

Rosenberg, L., "A Force Feedback Programming Primer," Immersion Corp., 1997, pp. 1-177.

Rosenberg, L., "Virtual Fixtures': Perceptual Overlays Enhance Operator Performance in Telepresence Tasks", Stanford University, Jun. 1994, pp. 1-214.

Rosenberg, L.B., "Commercially Viable Force Feedback Controller for Individuals with Neuromotor Disabilities", AL/CF-TR 1997-0016, United States Air Force Armstrong Laboratory, May 1996.

Rosenberg, Louis B. et al., "Perceptual Decomposition of Virtual haptic Surfaces," IEEE. Oct. 1993.

Rosenberg, Louis B., "Perceptual Design of a Virtual Rigid Surface Contact," Center for Design Research Stanford University, Air Force material Command, Apr. 1993, pp. 1-41.

Rosenberg, Louis B., "The Use of Virtual Fixtures as Perceptual Overlays to Enhance Operator Performance in Remote Environments," Air Force Material Command, Sep. 1992, pp. 1-42.

Rosenberg, Louis, B., "Virtual Fixtures as Tools to Enhance Operator Performance in Telepresence Environments," SPIE telemanipulator Technology, 1993.

Rosenberg, Louis B., "Virtual Haptic Overlays Enhance Performance in Telepresence Tasks," SPIE 1994.

Rosenberg, Louis B., The Use of Virtual Fixtures to Enhance Operator Performance in Time Delayed Teleoperation, Armstrong Laboratory, Mar. 1993, pp. 1-45.

Russo, Massimo Andrea, "The Design and Implementation of a Three Degree-of-Freedom Force Output Joystick," Department of Mechanical Engineering, May 11, 1990, pp. 9-40 & 96 & 97.

Schmult, Brian et al., "Application Areas for a force-Feedback Joystick," ASME 1993, DSC-vol. 49, pp. 47-54.

Slocum, Alexander H., "Precision Machine Design", Massachusetts Institute of Technology, Prentice Hall, Englewood Cliffs, New Jersey, 07632.

Smith, Geoffrey, "Call it Palpable Progress," Business Week, Oct. 9, 1995, pp. 93, 96.

Snow, E. et al., "Compact Force-Reflecting Hand Controller," JPL, Apr. 1991, vol. 15, No. 3, Item No. 153, pp. 1-15a.

Su. S. Augustine et al., "The Virtual Panel Architecture: A 3D Gesture Framework," IEEE 1993, pp. 387-398.

Tan, Hong Z et al., "Manual Resolution of Compliance When Work and Force Cues are Minimized,"ASME 1993, DSC-vol. 49, pp. 99-104.

Tan, Hong Z. et al., "Human Factors for the Design of Force-Reflecting Haptic Interfaces," Tan, Srinivasan, Eberman, & Chang, ASM WAM 1994, pp. 1-11.

Tavkhelidze, D.S., "Kinematic Analysis of Five-Link Spherical Mechanisms", Mechanism and Marching Theory, 1974, vol. 9, pp. 181-190, Pergamon Press, Printed in Great Britain.

Wiker, Steven F. et al., "Development of Tactile Mice for Blind Access to Computers: Importance of Stimulation Loces, Object Size, and Vibrotactile Display Resolution," Proc. of Human Factors Society 35th Annual Meeting 1991, pp. 708-712.

Winey III, C., "Computer Simulated Visual Tactile Feedback As An Aid to Manipulator and Vehicle Control", MIT, 1981, pp. 1-80.

Yamakita, M. et al., Tele-Virtual Reality of Dynamic Mechanical Model, IEEE Jul. 7-10, 1992, pp. 1103-1110.

Yokokohji et al., "What You Can See is What You Can Feel-Development of a Visual/Haptic Interface to Virtual Environment", Proceedings of VRAIS '96, IEEE 1996, pp. 46-54.

* cited by examiner

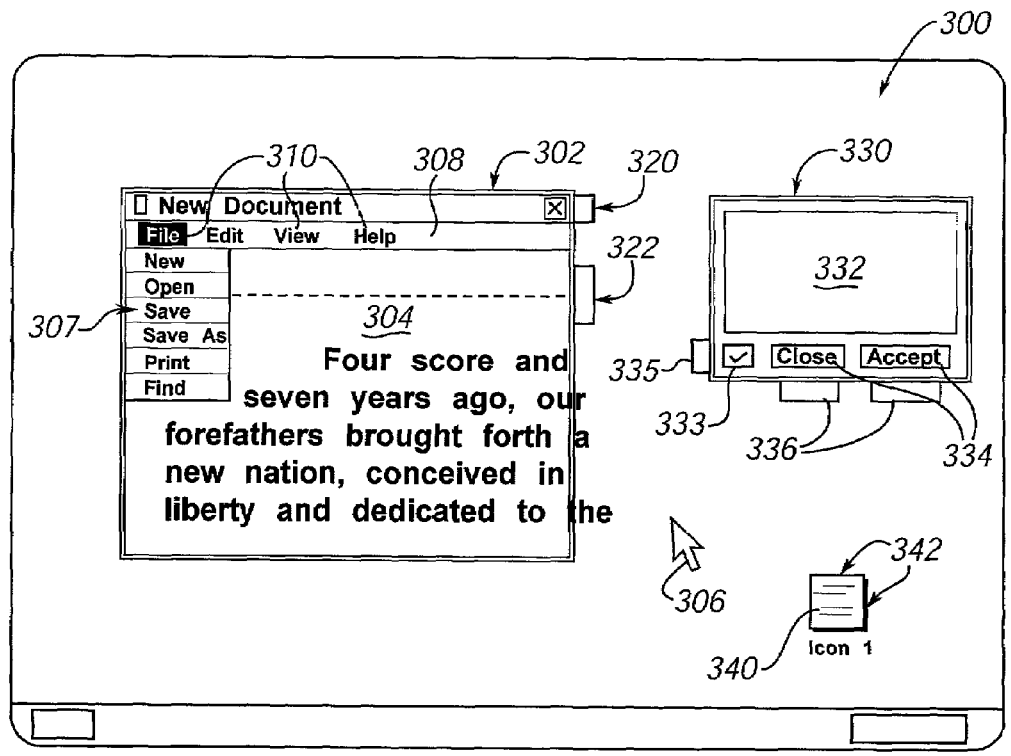
FIG. 4
FIG. 5a
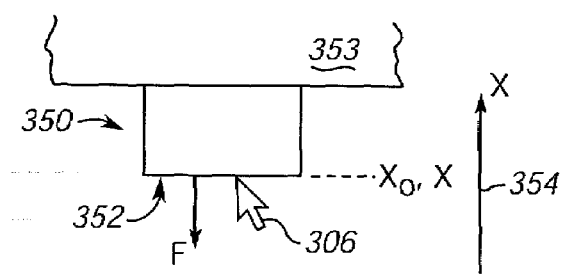
FIG. 5c
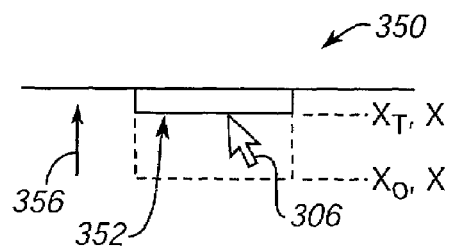
FIG. 5b
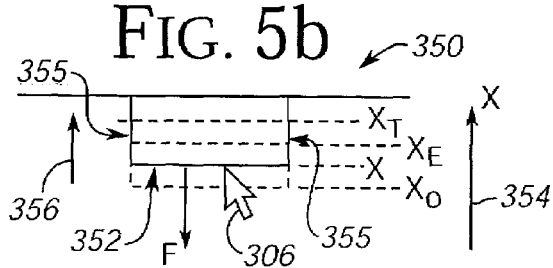
FIG. 5d
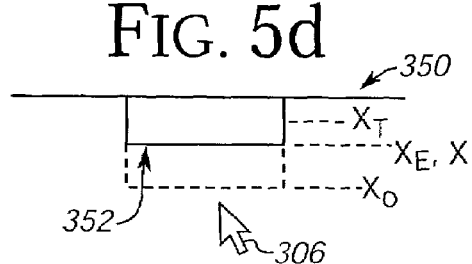

FORCE FEEDBACK APPLICATIONS BASED ON CURSOR ENGAGEMENT WITH GRAPHICAL TARGETS

CROSS REFERENCE TO RELATED APPLICATIONS

This application is a continuation of U.S. patent application Ser. No. 09/590,856, filed Jun. 8, 2000, now U.S. Pat. No. 6,317,116, which is a continuation of application Ser. No. 08/879,296, filed Jun. 18, 1997, now U.S. Pat. Ser. No. 6,078,308, which is a continuation-in-part of application Ser. No. 08/571,606, filed Dec. 13, 1995, now U.S. Pat. No. 6,219,032, and application Ser. No. 08/756,745, filed Nov. 26, 1996, now U.S. Pat. No. 5,825,308, all of which are assigned to the assignee of this present application, and all of which are incorporated by reference herein in their entireties.

BACKGROUND OF THE INVENTION

The present invention relates generally to interface devices for allowing humans to interface with computer systems, and more particularly to computer interface devices that allow the user to provide input to graphical environments on computer systems and provide force feedback to the user.

Computer systems are used extensively in many different industries to implement many applications, such as word processing, data management, simulations, games, and other tasks. A computer system typically displays a visual environment to a user on a display screen or other visual output device. Users can interact with the displayed environment to perform functions on the computer, play a game, experience a simulation or "virtual reality" environment, use a computer aided design (CAD) system, browse the World Wide Web, or otherwise influence events or images depicted on the screen.

One visual environment that is particularly common is a graphical user interface (GUI). GUI's present visual images which describe various graphical metaphors for functions of a program or operating system implemented on the computer. Common GUI's include the Windows® operating system from Microsoft Corporation, the MacOS operating system from Apple Computer, Inc., and X-Windows for Unix operating systems. These interfaces allows a user to graphically select and manipulate functions of the operating system and application programs by using an input interface device. The user typically moves a user-controlled graphical object, such as a cursor or pointer, across a computer screen and onto other displayed graphical objects or predefined screen regions, and then inputs a command to execute a given selection or operation. The objects or regions ("targets") can include, for example, icons, windows, pull-down menus, buttons, and scroll bars. Most GUI's are currently 2-dimensional as displayed on a computer screen; however, three dimensional (3-D) GUI's that present simulated 3-D environments on a 2-D screen can also be provided.

Other programs or environments that may provide user-controlled graphical objects such as a cursor include browsers and other programs displaying graphical "web pages" or other environments offered on the World Wide Web of the Internet, CAD programs, video games, virtual reality simulations, etc. In some graphical computer environments, the user may provide input to control a 3-D "view" of the graphical environment, i.e., the user-controlled graphical "object" can be considered the view displayed on the video screen. The user can manipulate the interface device to move the view, as if moving a camera through which the user is looking. This type of graphical manipulation is common in CAD or 3-D virtual reality applications.

User interaction with and manipulation of the graphical environment such as a GUI is achieved using any of a variety of types of human-computer interface devices that are connected to the computer system controlling the environment. In most systems, the computer updates the environment in response to the user's manipulation of a user-manipulatable physical object ("user object") that is included in the interface device, such as a mouse, joystick, trackball, etc. The computer provides visual and audio feedback of the GUI to the user utilizing the display screen and, typically, audio speakers.

One problem with current implementation of graphical user interfaces is that two distinct actions are typically required of a user to select a function with the GUI: first, the user must accurately guide the cursor to a desired target using a mouse or other device, and second, the user must press a physical button on the mouse or other device while the cursor is displayed over the target. Often, the user will inadvertently press the button while the cursor is not yet at the target, or after the cursor has just overshot the target, resulting in the desired function not being commanded; and the user then has to reposition the cursor and press the button again. Or, when a desired command requires the user to guide the cursor over a target and "double-click" the physical button, the user often misses the desired command since the cursor is off the target at the time of the second "click". Another problem with the current target acquisition and button press commands is that there is no physical feedback to the user confirming that the selection/command process has been successfully completed. A sound, such as a beep, may be used in some cases to confirm a completed command, but this is not very intuitive feedback.

SUMMARY OF THE INVENTION

The present invention is directed to a force feedback implementation of a graphical environment in which force feedback click surfaces are provided. These surfaces allow a user to select buttons, icons, and other graphical objects with movement of a mouse or other user manipulable object without requiring a separate manual command gesture, such as the pressing of a button on a mouse.

More specifically, the present invention provides a method and apparatus that displays a click surface in a graphical environment, such as a graphical user interface (GUI), implemented on a host computer for use with a force feedback interface device coupled to the host computer. A user-controlled graphical object, such as a cursor, is displayed in the graphical environment at a position corresponding to a position of a physical, moveable user object of the interface device grasped by a user. When the click surface is contacted by the cursor, a force is output opposing movement of the user object in a direction into the click surface and into the graphical object. When the user object has moved to or past a trigger position past the contact with the click surface, a command gesture signal is provided to the host computer indicating that the graphical object has been selected as if a physical input device on the user object, such as a button, has been activated by the user. Preferably, the user object is determined to have moved to the trigger position when the user object has moved a predetermined distance past the click surface from the point of contact. The force opposing the user object is preferably proportional to a distance between a present user object position and the original contact position.

The click surfaces of the present invention are described as three different types: an analog button, a positive action button, and a static selection surface. The analog button is a click surface that is displayed moving with the user object as it moves into the graphical object. The positive action button causes the click surface and the cursor to remain displayed at an original position while the user object moves past the click surface into the graphical object, where the click surface is displayed at a new position when the user object reaches the trigger position. A static selection surface causes the click surface and the cursor to be displayed at an original position of the click surface while the user object moves past the click surface into said graphical object and when the trigger position is reached (alternatively, the cursor can be moved with the user object).

The graphical object can be a graphical button in a GUI or Web page graphical environment, so that when the user object moves to the trigger position the button either toggles from an off state to an on state or from an on state to an off state. The click surface can also be an edge of a window, icon, or other object displayed in a graphical environment. For example, the signal to the host computer can indicate that an icon has been clicked or double-clicked by the user. The click surface can allow the user to select at least one program function associated with a graphical object with which the click surface is associated.

The interface device preferably includes actuators for outputting the force on the user object and sensors for detecting the position of the user object. A microprocessor local to the interface device can be included which reads the sensors, reports motion of the user object to the host computer, and controls the actuators. Preferably, the host computer displays the graphical environment including the click surface and the cursor, while the microprocessor controls the force output of the click surface in parallel with the host display of the graphical environment.

The microprocessor can receive an indication of a click surface from the host computer and determines penetration of the cursor into the click surface. The microprocessor outputs a force opposing motion of the user object into the click surface, and sends the host computer the command gesture signal when the user object is moved to or past the trigger position into the click surface. In one embodiment, the host determines when the cursor contacts the click surface and informs the microprocessor to output the force by sending parameters describing the click surface to the microprocessor. Alternatively, the microprocessor determines when the cursor contacts the click surface using location and other characteristic data of the click surface previously sent to the microprocessor from the host. The microprocessor can also clip data reported to the host computer when the user object moves into the click surface, such that the host does not display the cursor moving into the surface.

The method and apparatus of the present invention provide click surfaces for graphical objects in a displayed graphical environment which can be selected by movement of a cursor into the click surface. The user need not press a button or manually activate an input device to select an icon, push a graphical button, or otherwise manipulate graphical objects. The force of the click surface opposing motion into the click surface and trigger positions provide the user with an intuitive ability to select the click surfaces when the user desires. The microprocessor-host computer system provides an efficient architecture for implementing the click surfaces.

These and other advantages of the present invention will become apparent to those skilled in the art upon a reading of the following specification of the invention and a study of the several figures of the drawing.

BRIEF DESCRIPTION OF THE DRAWINGS

FIG. 4 is a diagram of a displayed graphical user interface which includes click surfaces of the present invention;

FIGS. 5a–5g are diagrammatic illustrations of an analog button embodiment of the click surface of the present invention;

DETAILED DESCRIPTION OF PREFERRED EMBODIMENTS

Figure 1:
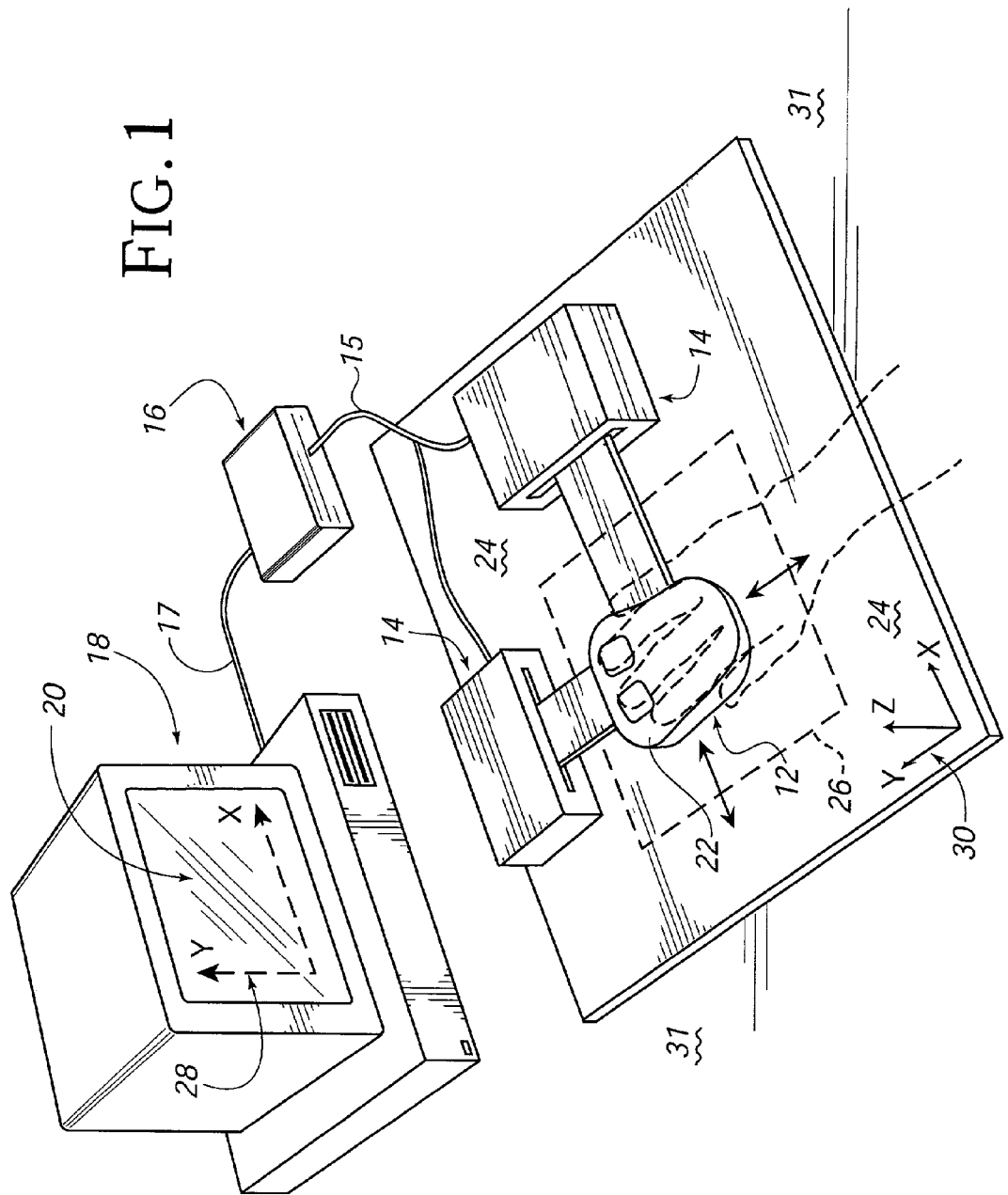
FIG. 1 is a perspective view of one embodiment of a force feedback interface device suitable for use with the present invention.

FIG. 1 is a perspective view of a force feedback interface system 10 suitable for use with the click surfaces of the present invention, capable of providing input to a host computer based on the user's manipulation of the device capable of providing force feedback to the user of the interface device based on events occurring in a program implemented by the host computer. Interface system 10 includes a user manipulable object 12, a mechanical interface 14, an electronic interface 16, and a host computer 18.

User manipulable object 12 ("user object", "physical object", or "manipulandum") used in conjunction with the present invention is preferably grasped or gripped and manipulated by a user. By "grasp," it is meant that users may releasably engage a portion of the object in some fashion, such as by hand, with their fingertips, or even orally in the case of handicapped persons. For example, images are displayed and/or modified on a display screen 20 of the computer system 18 in response to such manipulations. The illustrated interface system 10 includes a mouse object 22 as a user manipulable object. Mouse 22 is shaped so that a user's fingers or hand may comfortably grasp the object and move it in the provided degrees of freedom in physical space. For example, a user can move mouse 22 to correspondingly move a computer generated graphical object, such as a cursor or other image, in a graphical environment provided by computer 18. The available degrees of freedom in which user manipulable object 12 can be moved are determined from the mechanical interface 14, described below. In addition, mouse 22 preferably includes one or more buttons 15 to allow the user to provide additional commands to the computer system.

It will be appreciated that a great number of other types of user manipulable objects 12 can be used with the method and apparatus of the present invention. In fact, the present invention can be used with any mechanical object where it is desirable to provide a human/computer interface with multiple degrees of freedom. Such objects may include styluses, joysticks, spherical-, cubical-, or other-shaped hand grips, screwdrivers, steering wheels/controls, pool cues, medical instruments such as catheters, a stylus, a receptacle for receiving a finger or a stylus, pointer, pool cue, medical instrument, a flat, contoured, or gripped planar surface or card member, etc.

Mechanical interface apparatus 14 interfaces mechanical input and output between the user manipulable object 12 and host computer 18 implementing the graphical environment. Mechanical interface 14 provides multiple degrees of freedom to object 12; in the preferred embodiment, two linear, planar degrees of freedom are provided to the object, although greater or fewer degrees of freedom can be provided in alternate embodiments, as well as rotary degrees of freedom. For many applications, mouse 12 need only be moved in a very small area, shown as dashed line 26 in FIG. 1 as an example. This is because a graphical object such as a cursor can be moved across the entire length or width of screen 20 by moving mouse 12 only a short distance in physical space.

In a preferred embodiment, the user manipulates object 12 in a planar workspace, much like a traditional mouse, and the position of object 12 is translated into a form suitable for interpretation by position sensors of the mechanical interface 14. The sensors track the movement of the object 12 in planar space and provide suitable electronic signals to electronic interface 16. Electronic interface 16, in turn, provides position information to host computer 18. In addition, host computer 18 and/or electronic interface 16 provides force feedback information to actuators coupled to mechanical interface 14, and the actuators generate forces on members of the mechanical apparatus to provide forces on object 12 in provided or desired degrees of freedom. The user experiences the forces generated on the object 12 as realistic simulations of force sensations such as jolts, springs, textures, "barrier" forces, and the like. For example, when a rigid surface is generated on computer screen 20 and a computer object controlled by the user collides with the surface, the computer 18 will send force feedback signals to the electrical interface 16 and mechanical apparatus 14 to generate collision forces on object 12. Or, the host computer previously sends a layout of implemented graphical objects to the local microprocessor, and the microprocessor independently determines collisions and generates the necessary force feedback when graphical objects collide. One embodiment of mechanical interface 14 is shown in greater detail with respect to FIGS. 2a–2b.

Electronic interface 16 is a component of the interface system 10 and may couple the mechanical apparatus 14 to the host computer 18. Electronic interface 16 can be included within a housing of mechanical apparatus 14 or, alternatively, electronic interface 16 can be included in host computer 18. Or, all or portions of the electronic interface 16 can be provided as a separate unit with its own housing as shown in FIG. 1. More particularly, electronic interface 16 includes a local microprocessor separate from any microprocessors in the host computer 18 to control force feedback independently of the host computer, as described below, as well as sensor and actuator interfaces that convert electrical signals to appropriate forms usable by mechanical apparatus 14 and host computer 18. A suitable embodiment of interface 16 is described in detail with reference to FIG. 5.

The electronic interface 16 can be coupled to mechanical interface apparatus 14 by a bus 15 (or interface 16 is included within the housing of apparatus 14) and is coupled to the computer 18 by a bus 17 (or may be directly connected to a computer bus using a suitable interface). In other embodiments, signals can be sent to and from interface 16 and computer 18 by wireless transmission/reception. In preferred embodiments of the present invention, the interface 16 serves as an input/output (I/O) device for the computer 18. The interface 16 can also receive inputs from other input devices or controls that are associated with mechanical interface 14 or object 12 and can relay those inputs to computer 18. For example, commands sent by the user activating a button 15 on user object 12 can be relayed to computer 18 by interface 16 to implement a command or cause the computer 18 to output a command to the mechanical apparatus 14.

Host computer 18 is preferably a personal computer or workstation, such as an IBM-PC compatible computer or Macintosh personal computer, or a SUN or Silicon Graphics workstation. For example, the computer 18 can operate under the Windows™ or MS-DOS operating system in conformance with an IBM PC AT standard. Alternatively, host computer system 18 can be one of a variety of home video game systems commonly connected to a television set, such as systems available from Nintendo, Sega, or Sony. In other embodiments, home computer system 18 can be a "set top box" which can be used, for example, to provide interactive television functions to users, or a "network-" or "internet computer" which allows users to interact with a local or global network using standard connections and protocols such as used for the Internet and World Wide Web. Host computer preferably includes a host microprocessor, random access memory (RAM), read only memory (ROM), input/output (I/O) circuitry, and other components of computers well-known to those skilled in the art. Host computer 18 preferably implements a host application program with which a user is interacting via mouse 12 and mechanical interface apparatus 14 and other peripherals, if appropriate. For example, the host application program can be medical simulation, video game, World Wide Web page or browser that uses, for example, HTML or VRML data, scientific analysis program, virtual reality training program, or other application program that utilizes input of user object 12 and outputs force feedback commands to the object 12. Herein, for simplicity, operating systems such as Windows™, MS-DOS, MacOS, Unix, etc. are also referred to as "application programs." In one preferred embodiment, the application program utilizes a graphical user interface (GUI) to present options to a user and receive input from the user. Herein, computer 18 may be referred as displaying "graphical objects" or "computer objects." These objects are not physical objects, but are logical software unit collections of data and/or procedures that may be displayed as images by computer 18 on display screen 20, as is well known to those skilled in the art. A displayed cursor or a simulated cockpit of an aircraft might be considered a graphical object. The host application program checks for input signals received from electronic interface 16 and sensors of mechanical interface 14, and outputs force values and commands to be converted into forces on user object 12. Suitable software drivers which interface such simulation software with computer input/output (I/O) devices are available from Immersion Human Interface Corporation of San Jose, Calif.

Display device 20 can be included in host computer 18 and can be a standard display screen (LCD, CRT, etc.), 3-D goggles, or any other visual output device. Typically, the host application provides images to be displayed on display device 20 and/or other feedback, such as auditory signals. For example, display screen 20 can display images from a GUI. Images describing a moving, first person point of view can be displayed, as in a virtual reality game. Or, images describing a third-person perspective of objects, backgrounds, etc. can be displayed. Alternatively, images from a simulation, such as a medical simulation, can be displayed, e.g., images of tissue and a representation of object 12 moving through the tissue, etc.

There are two primary "control paradigms" of operation for interface system 10: position control and rate control. Position control refers to a mapping of user object 12 in which displacement of the user object in physical space directly dictates displacement of a graphical object. The mapping can have an arbitrary scale factor or even be non-linear, but the fundamental relation between user object displacements and graphical object displacements should be present. Under a position control mapping, the computer object does not move unless the user object is in motion. Also, "ballistics" for mice type devices can be used, in which small motions of the mouse have a different scaling factor for cursor movement than large motions of the mouse to allow more control of small movements. Position control is not a popular mapping for traditional computer games, but is popular for other applications such as graphical user interfaces (GUI's) or medical procedure simulations.

As shown in, FIG. 1, the host computer may have its own "host frame" 28 which is displayed on the display screen 20. In contrast, the mouse 12 has its own "local frame" 30 in which the mouse 12 is moved. In a position control paradigm, the position (or change in position) of a user-controlled graphical object, such as a cursor, in host frame 28 corresponds to a position (or change in position) of the mouse 12 in the local frame 30.

The offset between the graphical object in the host frame and the object in the local frame can preferably be changed by the user in an "Indexing mode." If mouse 12 reaches a limit to movement in the provided planar workspace, indexing allows the mouse 12 to be repositioned with respect to the user-controlled graphical object such as a cursor. Indexing is preferably achieved through an input device, such as a button 15 or switches, sensors, or other input devices. For example, a specialized indexing button can be provided. While the indexing button is activated, the user object 12 is in indexing mode and can be moved without providing location data to the host computer. When the button is deactivated, non-indexing mode is resumed, and cursor position is again controlled by the position of the user object. In one embodiment, the functionality of a safety switch and the indexing mode are integrated into one input device, where indexing mode is active when the safety switch is opened, thus deactivating actuators when the mouse 12 is repositioned. Indexing mode can be performed directly by the host computer 18, or by local microprocessor 200. For example, local processor 200 can determine when indexing mode is active, and simply not report the position of the user object 12 to the host computer 18 while such mode is active.

Rate control is also used as a control paradigm. This refers to a mapping in which the displacement of the mouse 12 along one or more provided degrees of freedom is abstractly mapped to motion of a computer-simulated object under control. There is not a direct physical mapping between physical object (mouse) motion and computer object motion. Thus, most rate control paradigms are fundamentally different from position control in that the user object can be held steady at a given position but the controlled graphical object is in motion at a commanded or given velocity, while the position control paradigm only allows the controlled computer object to be in motion if the user object is in motion.

The mouse interface system 10 is adept at both position control ("isotonic") tasks and rate control ("isometric") tasks. For example, as a traditional mouse, the position of mouse 12 in the workspace 24 can be directly mapped to a position of a cursor on display screen 20 in a position control paradigm. Alternatively, the displacement of mouse 12 in a particular direction against an opposing output force can command rate control tasks in an isometric mode. An implementation that provides both isotonic and isometric functionality for a force feedback controller and which is very suitable for the present invention is described in parent application Ser. No. 08/756,745, incorporated by reference herein.

Mouse 22 can be moved on a grounded pad 24 or similar surface in some embodiments of the present invention. In some embodiments, mouse 22 does not touch pad 24 or ground surface 31 since it is coupled to a mechanical structure or suspended above the pad. Thus, the pad can be used as a reference for the user to show the workspace of the mouse. In alternate embodiments, mouse 22 can touch the surface of pad 24 or grounded surface 31 to provide additional support for the mouse and relieve stress on mechanical apparatus 14. In such an embodiment, a wheel, roller, or other device is preferably used on mouse to minimize friction between the mouse and the contacted surface.

Mouse 22 can be used, for example, to control a computer-generated graphical object such as a cursor displayed in a graphical computer environment, such as a GUI. The user can move the puck in 2D planar workspace to move the cursor to graphical objects in the GUI or perform other tasks. In other graphical environments, such as a virtual reality video game, a user can be controlling a computer player or vehicle in the virtual environment by manipulating the mouse 12. The computer system tracks the position of the mouse with sensors as the user moves it. The computer system may also provide force feedback to the mouse, for example, when the user moves the graphical object against a generated surface such as an edge of a window, a virtual wall, etc. It thus appears and feels to the user that the mouse and the graphical object are contacting real surfaces.

Figure 2A:
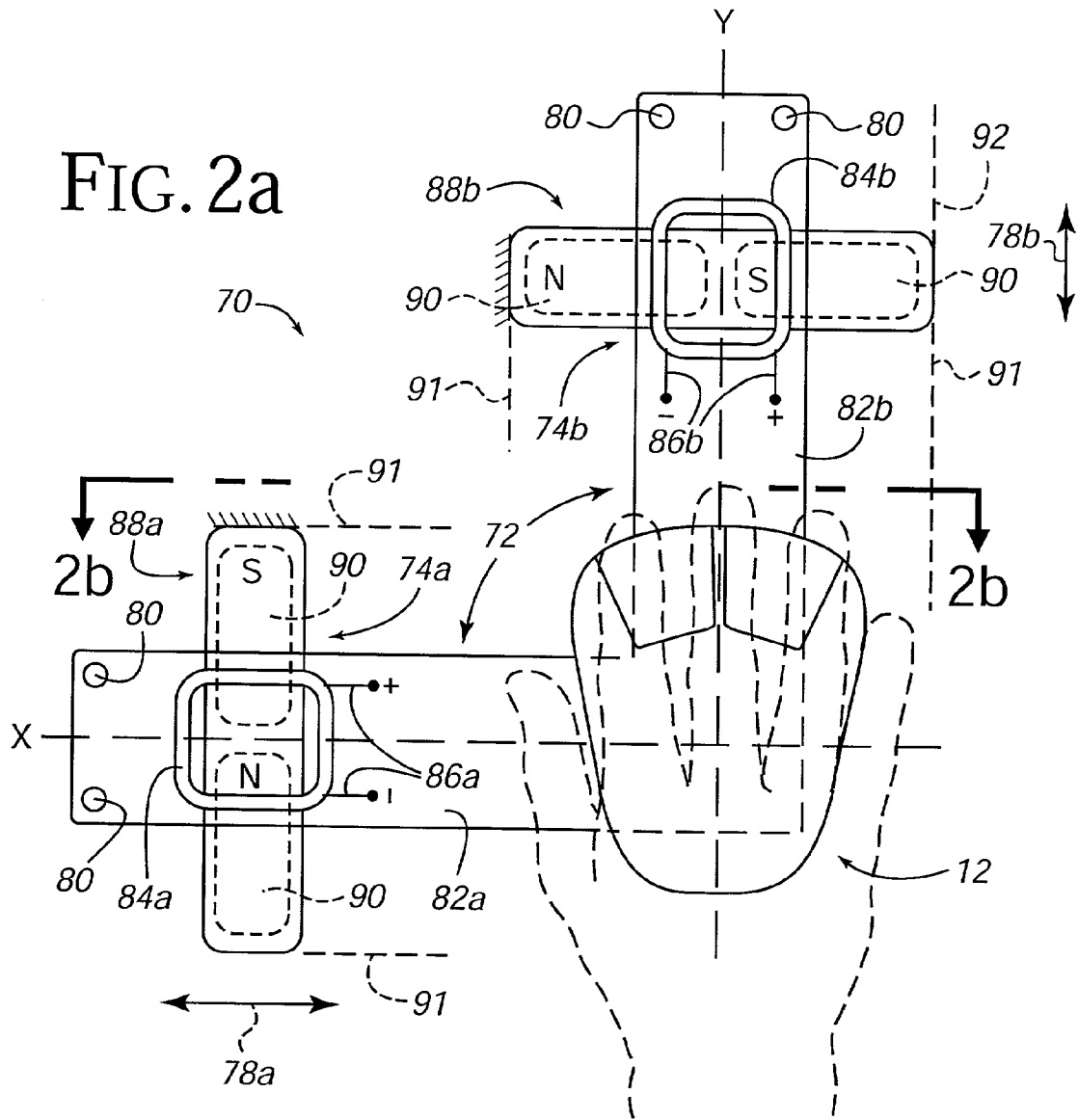
FIGS. 2a and 2b are top plan and side elevation views of an embodiment of a mechanical apparatus suitable for use in the interface device of FIG. 1.
Figure 2B:
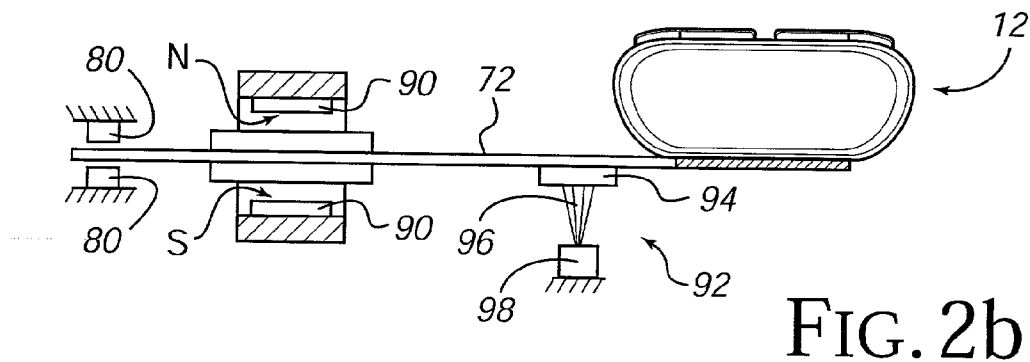

FIG. 2a is a top plan view and FIG. 2b is a side elevational view of one embodiment 70 of mechanical apparatus 14 and user object 12 suitable for use in interface system 10, in which electromagnetic voice coil actuators are used to provide forces to the user object. Such voice coil actuators are described in greater detail in co-pending patent application Ser. No. 08/560,091, hereby incorporated by reference herein in its entirety, and application Ser. No. 08/756,745. Interface apparatus 70 provides two linear degrees of freedom to user object 12 so that the user can translate object 12 in a planar workspace along the X axis, along the Y axis, or along both axes (diagonal movement). Apparatus 70 includes user object 12 and a board 72 that includes voice coil actuators 74a and 74b and guides 80.

Apparatus 70 includes user object 12 and a board 72 that includes voice coil actuators 74a and 74b and guides 80. Object 12 is rigidly coupled to board 72, which, for example, can be a circuit board etched with conductive materials. Board 72 is positioned in a plane substantially parallel to the X-Y plane and floats. Board 72 and object 12 may thus be translated along axis X and/or axis Y, shown by arrows 78*a* and 78*b* and guided by guides 80, thus providing the object 12 with linear degrees of freedom. Board 72 is provided in a substantially right-angle orientation having one extended portion 82*a* at 90 degrees from the other extended portion 82*b*.

Voice coil actuators 74*a* and 74*b* are positioned on board 72 such that one actuator 74*a* is provided on portion 82*a* and the other actuator 74*b* is provided on portion 82*b*. Wire coil 84*a* of actuator 74*a* is coupled to portion 82*a* of board 72 and includes at least two loops of wire etched or otherwise placed onto board 72, preferably as a printed circuit board trace. Terminals 86*a* are coupled to actuator drivers, so that host computer 12 or microprocessor 26 can control the direction and/or magnitude of the current in wire coil 84*a*. Voice coil actuator 74*a* also includes a magnet assembly 88*a*, which preferably includes four magnets 90 and is grounded, where coil 84*a* is positioned between opposing polarities of the magnet.

The magnetic fields from magnets 90 interact with a magnetic field produced from wire coil 84*a* when current is flowed in coil 84*a* to produce forces. As an electric current I is flowed through the coil 84*a* via electrical connections 86*a*, a magnetic field is generated from the current and configuration of coil 84*a*. The magnetic field from the coil then interacts with the magnetic fields generated by magnets 90 to produce a force on board 72 and on object 12 along axis Y. The magnitude or strength of the force is dependent on the magnitude of the current that is applied to the coil, the number of loops in the coil, and the magnetic field strength of the magnets. The direction of the force depends on the direction of the current in the coil. A voice coil actuator can be provided for each degree of freedom of the mechanical apparatus to which force is desired to be applied.

Limits 91 or physical stops can be positioned at the edges of the board 72 to provide a movement limit. Voice coil actuator 74*b* operates similarly to actuator 74*a* to produce a force on board 72 and object 12 along axis X. In yet other embodiments, the translatory motion of board 72 along axes X and Y can be converted to two rotary degrees of freedom, or additional degrees of freedom can be similarly provided with voice-coil actuation, such as an up-down or spin degrees of freedom along/about a z-axis.

Voice coil actuator 74*a* can also be used as a sensor to sense the velocity, position, and or acceleration of board 72 along axis Y. Motion of coil 84*a* along axis Y within the magnetic field of magnets 90 induces a voltage across the coil 84*a*, and this voltage can be sensed. This voltage is proportional to the velocity of the coil and board 72 along axis Y. From this derived velocity, acceleration or position of the board 72 can be derived. In other embodiments, separate digital sensors may be used to sense the position, motion, etc. of object 12 in low cost interface devices. For example, a lateral effect photo diode sensor 92 can be used, including a rectangular detector 94 positioned in a plane parallel to the X-Y plane onto which a beam of energy 96 is emitted from a grounded emitter 98. The position of the board 72 and object 12 can be determined by the location of the beam 96 on the detector.

An alternate embodiment of a mechanical apparatus 14 having linear electromagnetic actuators and a rotary or flexible linkage can also be used and is described in patent application Ser. No. 08/756,745.

A different embodiments of a mechanical apparatus 14 for a mouse interface system includes a mechanical linkage, and is described in detail in parent application Ser. No. 08/756, 745. Other mechanisms can also be used in other embodiments to provide a user object 12 with two or more degrees of freedom. Other embodiments having rotary degrees of freedom are also suitable for the present invention and are disclosed therein. Other embodiments may include a joystick or other user objects rather than a mouse to control cursors or other graphical objects; one suitable joystick embodiment with a closed-loop five bar linkage as mechanical apparatus 14 is disclosed in application Ser. No. 08/571, 606.

Figure 3:
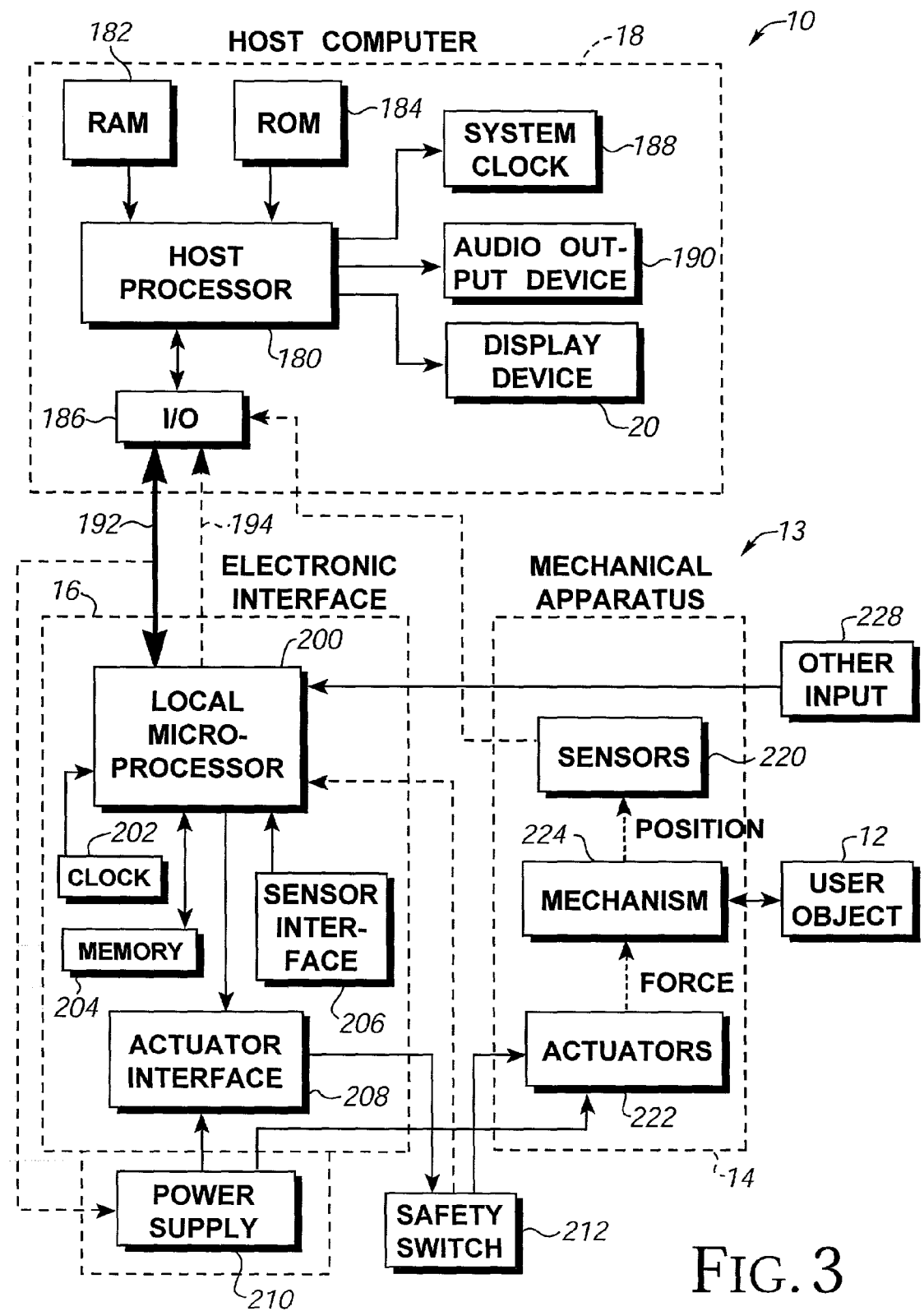
FIG. 3 is a block diagram of a system for controlling a force feedback interface device of the present invention.

FIG. 3 is a block diagram illustrating electronic interface 16 and host computer 18 suitable for use with the present invention. Interface system 10 includes a host computer 18, electronic interface 16, mechanical apparatus 14, and user object 12. Electronic interface 16, mechanical apparatus 14, and user object 12 can also collectively be considered a "force feedback interface device" 13 that is coupled to the host. A similar system is described in detail in co-pending patent application Ser. No. 08/566,282, which is hereby incorporated by reference herein in its entirety.

As explained with reference to FIG. 1, computer 18 is preferably a personal computer, workstation, video game console, or other computing or display device. Host computer system 18 commonly includes a host microprocessor 180, random access memory (RAM) 182, read-only memory (ROM) 184, input/output (I/O) electronics 186, a clock 188, a display device 20, and an audio output device 190. Host microprocessor 180 can include a variety of available microprocessors from Intel, AMD, Motorola, or other manufacturers. Microprocessor 180 can be single microprocessor chip, or can include multiple primary and/or co-processors. Microprocessor preferably retrieves and stores instructions and other necessary data from RAM 182 and ROM 184 as is well known to those skilled in the art. In the described embodiment, host computer system 18 can receive sensor data or a sensor signal via a bus 192 from sensors of apparatus 14 and other information. Microprocessor 180 can receive data from bus 192 using I/O electronics 186, and can use I/O electronics to control other peripheral devices. Host computer system 18 can also output commands to interface device 13 via bus 192 to cause force feedback for the interface system 10.

Clock 188 is a standard clock crystal or equivalent component used by host computer 18 to provide timing to electrical signals used by host microprocessor 180 and other components of the computer system 18. Display device 20 is described with reference to FIG. 1. Audio output device 190, such as speakers, can be coupled to host microprocessor 180 via amplifiers, filters, and other circuitry well known to those skilled in the art. Other types of peripherals can also be coupled to host processor 180, such as storage devices (hard disk drive, CD ROM drive, floppy disk drive, etc.), printers, and other input and output devices.

Electronic interface 16 is coupled to host computer system 18 by a bi-directional bus 192 (bus 17 of FIG. 1 can include bus 192 and/or bus 194). The bi-directional bus sends signals in either direction between host computer system 18 and the interface device 13. Bus 192 can be a serial interface bus providing data according to a serial communication protocol, a parallel bus using a parallel protocol, or other types of buses. An interface port of host computer system 18, such as an RS232 serial interface port, connects bus 192 to host computer system 18. In another embodiment, an additional bus 194 can be included to communicate between host computer system 18 and interface device 13. Bus 194 can be coupled to a second port of the host computer system, such as a "game port", such that two buses 192 and 194 are used simultaneously to provide a increased data bandwidth. One preferred serial interface used in the present invention is the Universal Serial Bus (USB). The USB standard provides a relatively high speed serial interface that can provide force feedback signals in the present invention with a high degree of realism. USB can also source power to drive actuators and other devices of the present invention. Since each device that accesses the USB is assigned a unique USB address by the host computer, this allows multiple devices to share the same bus. In addition, the USB standard includes timing data that is encoded along with differential data.

Electronic interface 16 includes a local microprocessor 200, local clock 202, local memory 204, sensor interface 206, and actuator interface 208. Interface 16 may also include additional electronic components for communicating via standard protocols on buses 192 and 194. In various embodiments, electronic interface 16 can be included in mechanical apparatus 14, in host computer 18, or in its own separate housing.

Local microprocessor 200 preferably coupled to bus 192 and may be closely linked to mechanical apparatus 14 to allow quick communication with other components of the interface device. Processor 200 is considered "local" to interface device 13, where "local" herein refers to processor 200 being a separate microprocessor from any processors 180 in host computer 18. "Local" also preferably refers to processor 200 being dedicated to force feedback and sensor I/O of the interface system 10, and being closely coupled to sensors and actuators of the mechanical apparatus 14, such as within the housing of or in a housing coupled closely to apparatus 14. Microprocessor 200 can be provided with software instructions to wait for commands or requests from computer host 18, parse/decode the command or request, and handle/control input and output signals according to the command or request. In addition, processor 200 preferably operates independently of host computer 18 by reading sensor signals and calculating appropriate forces from those sensor signals, time signals, and force processes selected in accordance with a host command, and output appropriate control signals to the actuators. Suitable microprocessors for use as local microprocessor 200 include the MC68HC711E9 by Motorola and the PIC16C74 by Microchip, for example. Microprocessor 200 can include one microprocessor chip, or multiple processors and/or co-processor chips. In other embodiments, microprocessor 200 can include digital signal processor (DSP) functionality.

For example, in one host-controlled embodiment that utilizes microprocessor 200, host computer 18 can provide low-level force commands over bus 192, which microprocessor 200 directly transmits to the actuators. In a different local control embodiment, host computer system 18 provides high level supervisory commands to microprocessor 200 over bus 192, and microprocessor 200 manages low level force control loops to sensors and actuators in accordance with the high level commands and independently of the host computer 18. In the local control embodiment, the microprocessor 200 can process inputted sensor signals to determine appropriate output actuator signals by following the instructions of a "force process" that may be stored in local memory and includes calculation instructions, formulas, force magnitudes, or other data. The force process can command distinct force sensations, such as vibrations, textures, jolts, enclosures, or simulated interactions between displayed objects. Sensor signals used by microprocessor 200 are also reported to host computer system 18, which updates a host application program and outputs force control signals as appropriate. For example, if the user moves a user object 12, the computer system 18 receives position and/or other signals indicating this movement and can move a displayed cursor in response. These embodiments are described in greater detail in co-pending application Ser. Nos. 08/534,791 and 08/566,282. In an alternate embodiment, no local microprocessor 200 is included in interface system 10, and host computer 18 directly controls and processes all signals to and from the interface 16 and mechanical apparatus 14.

A local clock 202 can be coupled to the microprocessor 200 to provide timing data, similar to system clock 188 of host computer 18; the timing data might be required, for example, to compute forces output by actuators 30 (e.g., forces dependent on calculated velocities or other time dependent factors). In alternate embodiments using the USB communication interface, timing data for microprocessor 200 can be retrieved from the USB interface. Local memory 204, such as RAM and/or ROM, is preferably coupled to microprocessor 200 in interface 16 to store instructions for microprocessor 200 and store temporary and other data, such as data pertaining to objects in a graphical user interface or locations required for force determination. Microprocessor 26 may also store calibration parameters in a local memory 204 such as an EEPROM.

Sensor interface 206 may optionally be included in electronic interface 16 convert sensor signals to signals that can be interpreted by the microprocessor 200 and/or host computer system 18. For example, sensor interface 206 can receive signals from a digital sensor such as an encoder and converts the signals into a digital binary number representing the position of a shaft or component of mechanical apparatus 14. Or, sensor signals from the sensors can be provided directly to host computer system 18, bypassing microprocessor 200 and sensor interface 206. Other types of interface circuitry 206 can also be used. For example, an electronic interface is described in U.S. Pat. No. 5,576,727, which is hereby incorporated by reference herein.

Actuator interface 208 can be optionally connected between the actuators of apparatus 14 and microprocessor 200. Interface 208 converts signals from microprocessor 200 into signals appropriate to drive the actuators. Interface 208 can include power amplifiers, switches, digital to analog controllers (DACs), and other components. Such interfaces are well known to those skilled in the art. In alternate embodiments, interface 208 circuitry can be provided within microprocessor 200 or in the actuators.

Power supply 210 can optionally be coupled to actuator interface 208 and/or actuators 222 to provide electrical power. Active actuators typically require a separate power source to be driven. Power supply 210 can be included within the housing of interface 16 or apparatus 14, or can be provided as a separate component, for example, connected by an electrical power cord. Alternatively, if the USB or a similar communication protocol is used, actuators and other components can draw power from the USB and thus have no (or minimal) need for power supply 210. Alternatively, power from the USB can be stored and regulated by interface 16 or apparatus 14 and thus used when needed to drive actuators 222. For example, power can be stored over time by a battery or capacitor circuit.

Mechanical apparatus 14 is coupled to electronic interface 16 preferably includes sensors 220, actuators 222, and mechanism 224. Sensors 220 sense the position, motion, and/or other characteristics of a user object 12 along one or more degrees of freedom and provide signals to microprocessor 200 including information representative of those characteristics, as described above. Digital sensors, analog sensors, and/or non-contact sensors, such as Polhemus (magnetic) sensors for detecting magnetic fields from objects, or an optical sensor such as a lateral effect photo diode having an emitter/detector pair, can be used. Also, velocity sensors (e.g., tachometers) for measuring velocity of object 12 and/or acceleration sensors (e.g., accelerometers) for measuring acceleration of object 12 can be used.

Actuators 222 transmit forces to user object 12 in one or more directions along one or more degrees of freedom in response to signals output by microprocessor 200 and/or host computer 18, i.e., they are "computer controlled." Typically, an actuator 222 is provided for each degree of freedom along which forces are desired to be transmitted. Actuators 222 can include two types: active actuators and passive actuators. Active actuators include linear current control motors, stepper motors, pneumatic/hydraulic active actuators, a torquer (motor with limited angular range), a voice coil actuator, and other types of actuators that transmit a force to an object. Passive actuators can include such as magnetic particle brakes, friction brakes, pneumatic/hydraulic passive actuators, or viscous dampers, and generate a damping resistance or friction in a degree of motion. In addition, in voice coil embodiments, multiple wire coils can be provided, where some of the coils can be used to provide back EMF and damping forces.

Mechanism 224 can be one of several types of mechanisms, including those described above in FIG. 2. For example, mechanisms disclosed in co-pending patent application Ser. Nos. 08/092,974, 08/275,120, 08/344,148, 08/374,288, 08/400,233, 08/489,068, 08/560,091, 08/623,660, 08/664,086, and 08/709,012, all hereby incorporated by reference herein in their entirety, can be included. User object 12 can be a mouse, puck, joystick, stylus receiving object, finger receiving object, or other device or article coupled to mechanism 220, as described above.

Other input devices 228 can optionally be included in interface system 10 and send input signals to microprocessor 200 and/or host computer 18. Such input devices can include buttons, such as buttons 15 on mouse 12, used to supplement the input from the user to a GUI, game, simulation, etc. Also, dials, switches, thumb wheels, hat switches, voice recognition hardware (with software implemented by host 18), or other input devices can be used.

Safety or "deadman" switch 212 is preferably included in interface device to provide a mechanism to allow a user to override and deactivate actuators 222, or require a user to activate actuators 222, for safety reasons. For example, the user must continually activate or close safety switch 212 during manipulation of user object 12 to activate the actuators 222. If, at any time, the safety switch is deactivated (opened), power from power supply 210 is cut to actuators 222 (or the actuators are otherwise deactivated) as long as the safety switch is deactivated. One embodiment of safety switch is a mechanical or optical switch located on user object 12 that is closed when the sensor of the switch is blocked from sensing ambient light by the user's hand. Other types of safety switches 212 can also be used, such as an electrostatic contact switch or a hand weight safety switch that detects the weight of the user's hand, as disclosed in parent application Ser. No. 08/756,745. In some embodiments, the state of the safety switch is provided to the microprocessor 200 and/or can be sent to the host 18, which can choose to stop sending force feedback commands if the safety switch is open.

In some embodiments of interface system 10, multiple mechanical apparatuses 14 and/or electronic interfaces 16 can be coupled to a single host computer system 18 through bus 192 (or multiple buses 192) so that multiple users can simultaneously interface with the host application program (in a multi-player game or simulation, for example). In addition, multiple players can interact in the host application program with multiple interface systems 10 using networked host computers 18, as is well known to those skilled in the art.

FIG. 4 is a diagrammatic illustration of display screen 20 displaying a graphical user interface (GUI) 300 used for interfacing with an application program and/or operating system implemented by computer system 18. The present invention implements force feedback technologies to embellish a graphical user interface with physical sensations. By communicating with interface device 13 (or a similar force feedback apparatus), the computer 18 can present not only standard visual and auditory information to the user, but also physical forces. These physical forces can be carefully designed to enhance manual performance in at least two ways. First, physical forces can be used to provide haptic sensory cues on user object 12 which increase a user's perceptual understanding of the GUI spatial "landscape" portrayed on display screen 20. Second, computer-generated forces can be used to provide physical constraints or assistive biases which actually help the user acquire and maintain the cursor at a given target displayed on screen 20 within GUI 300. A detailed explanation of forces provided within a GUI or other graphical environment and many different examples of forces provided for different graphical objects and areas in GUI 300 are described in parent patent application Ser. Nos. 08/571,606 and 08/756,745.

The manual tasks of the user to move a cursor displayed on screen 20 by physically manipulating physical user object 12 in order to command the cursor to a desired location or displayed object, can be described as "targeting" activities. "Targets," as referenced herein, are defined regions in the GUI 300 to which a cursor may be moved by the user that are associated with one or more forces and which are typically associated with graphical objects of GUI 300. Such targets can be associated with, for example, graphical objects such as icons, pull-down menu items, and graphical buttons. A target usually is defined as the exact dimensions of its associated graphical object, and is superimposed and "attached" to its associated graphical object such that the target has a constant spatial position with respect to the graphical object. In the GUI context, "graphical objects" are those images appearing on the display screen which the user may select with a cursor to implement a function of an application program or operating system, such as displaying images, executing an application program, or performing another computer function (a cursor may also be considered a graphical object.). For simplicity, the term "target" may refer to the entire graphical object with which the target is associated. However, more generally, a target need not follow the exact dimensions of the graphical object associated with the target and can also be a different size and/or shape or may be positioned a distance away from its associated graphical object. The entire screen or background of GUI 300 can also be considered a "target" which may provide forces on user object 12.

Upon moving the cursor to the desired target, the user typically maintains the cursor at the acquired target while providing a "command gesture" associated with a physical action such as pressing a button, squeezing a trigger, or otherwise providing a command to execute a particular (isotonic) program function associated with the target. For example, the "click" (press) of a physical button positioned on a mouse while the cursor is on an icon allows an application program that is associated with the icon to execute. Likewise, the click of a button while the cursor is on a portion of a window allows the user to move or "drag" the window across the screen by moving the user object.

The present invention provides alternatives in inputting a command gesture to the host computer system, in which the mechanical button or other physical input device need not be activated. Instead, "click surfaces" are provided within the graphical environment itself to provide the command gestures. Click surfaces are described in greater detail below.

The GUI permits the user to access various functions implemented by an operating system or application program running on computer system 18. These functions typically include, but are not limited to, peripheral input/output functions (such as writing or reading data to disk or another peripheral), selecting and running application programs and other programs that are independent of the operating system, selecting or managing programs and data in memory, viewing/display functions (such as scrolling a document in a window, displaying and/or moving a cursor or icon across the screen, displaying or moving a window, displaying menu titles and selections, etc.), and other functions implemented by computer system 18. For simplicity of discussion, the functions of application programs such as word processors, spreadsheets, CAD programs, video games, web pages, and other applications as well as functions of operating systems such as Windows™, MacOS™, and Unix, will be subsumed into the term "program functions." Typically, application programs make use of such functions to interface with the user; for example, a word processor will implement a window function of an operating system (or GUI, if the GUI is separate from the operating system) to display a text file in a window on the display screen.

In addition, other types of interfaces are also considered GUI's herein and can be used with the present invention. For example, a user can set up a "web page" on the World Wide Web which is implemented by a remote computer or server. The remote computer is connected to host computer 18 over a network such as the Internet and the Web page can be accessed by different users through the network using a browser or similar program. The page can include graphical objects similar to the graphical objects of a GUI, such as icons, pull-down menus, graphical buttons, etc., as well as other graphical objects, such as "links" that access a different web page or page portion when selected. These graphical objects can have forces associated with them for use with the click surfaces of the present invention. Force feedback used with Web pages and interfaces is described in greater detail in co-pending patent application Ser. No. 08/691,852, which is hereby incorporated by reference herein in its entirety.

GUI 300 is preferably implemented on host computer 18 and the associated feel sensations implemented with assistance of processor 200 using program instructions. The use of program instructions to perform functions and operations on a host computer 18 and/or microprocessor 200 is well known to those skilled in the art, and can be stored on a "computer readable medium." Herein, such a medium includes by way of example memory such as RAM and ROM coupled to host computer 18, memory 204, magnetic disks, magnetic tape, optically readable media such as CD ROMs, semiconductor memory such as PCMCIA cards, etc. In each case, the medium may take the form of a portable item such as a small disk, diskette, cassette, etc., or it may take the form of a relatively larger or immobile item such as a hard disk.

In a preferred embodiment, high-level host commands can be used to indicate the various forces used in the present invention. The local control mode using microprocessor 200 can be helpful in increasing the response time for forces applied to the user object, which is essential in creating realistic and accurate force feedback. For example, it may be convenient for host computer 18 to send a "spatial representation" to microprocessor 200, which is data describing the layout of some or all the graphical objects displayed in the GUI which are associated with forces and the types of these graphical objects. The microprocessor can store such a spatial representation in memory 204. In addition, the microprocessor 200 can be provided with the necessary instructions or data to check sensor readings, determine cursor and target (graphical object) positions, and determine output forces independently of host computer 18. The host could implement program functions (such as displaying images) when appropriate, and synchronization signals can be communicated between processor 200 and host 18 to correlate the microprocessor and host processes. Also, memory 204 can store predetermined force sensations for microprocessor 200 that are to be associated with particular types of graphical objects.

For example, one useful host command for use with force feedback in GUI's is an "enclosure" command. The enclosure command instructs the interface device 13 to define a rectangular region composed of four surfaces (or walls). The enclosure sensation is typically associated with graphical objects in the GUI that are rectangular in nature. For example, an enclosure can represent the feel of interacting with a window boundary, the feel of a spread-sheet cell, the feel of a rectangular button, the feel of a menu bar, the feel of a menu element. Sensations associated with the enclosure include a "barrier" feel upon entering or exiting the region, a texture sensation when rubbing along a boundary surface, and a texture sensation when within the bounds of the enclosure. The host computer defines characteristics of the enclosure to be implemented by the local microprocessor by specifying parameters to the local microprocessor, which may include:

Location and Size of the enclosure: The location is synchronized between the host frame and the local frame. If indexing is allowed (see FIG. 6*c*), then an X offset and Y offset is tracked between these two frames. If indexing is not allowed, the mapping is fixed between the two frames. Ideally, the index offset is maintained by the local microprocessor.

Wall Stiffness and Wall Width: Each of the walls of the enclosure can have a stiffness (or hardness) that represents the strength of the force that resists penetration of the wall. Each of the walls of the enclosure also can have a width (or puncture) that represents how easy or hard it is to pop through the wall to the other side. Each wall can have two values for stiffness and width, corresponding to each direction from which the cursor approaches the wall.

Surface Texture and Surface Fiction: A texture and/or friction feel can be provided when the cursor moves along the surface of the wall to create a rubbing sensation. Surface friction is one or more parameters that governs surface viscous damping or coulomb friction in the parallel direction when the cursor is engaged against a wall of the enclosure. Surface texture is defined by parameters that governs the texture force perpendicular to the wall when the cursor is engaged against the wall, and can include a spatial frequency and an intensity.

Clipping: When clipping is on, the mouse device creates a perceptual illusion of wall-hardness by breaking the mapping between the cursor and mouse position in the direction into the wall. The mouse reports to the host computer a fixed location value with respect to motion into the wall, causing the cursor to be displayed at the wall, even if the user is pushing the mouse beyond the surface of the simulated wall. The direct mapping between mouse and cursor location is restored when the user object is moved away from the wall. The end result is a wall that is perceived as being rigid, even if it is not. Clipping can have a penetration threshold, such that when the user object moves the threshold, the normal mapping between mouse and cursor is restored.

Pressure Mode: is an optional on/off parameter that allows the amount of force the user provides against (normal to) the wall to modify the intensity of friction and texture force sensations felt when moving along the wall surface.

Through-State: When on, allows the local microprocessor to automatically terminate the enclosure when a user passes across a wall in a particular direction.

Central Region Texture/Friction: Governs texture and friction of the inside region of the enclosure (i.e., when the cursor is inside the rectangle and not pressing against a wall).

Speed of Engagement: Sensations associated with crossing a wall in a given direction may have a speed threshold associated with them. For example, when moving the cursor quickly over an enclosure the user will not feel any of the sensations, but when moving the cursor slowly, the user will feel the sensations. A global speed parameter can be defined if desired. Individual speed parameters can also be defined for individual force sensations.

Scroll Surface: Any wall of the enclosure can be defined as a scroll surface. When a wall is penetrated some distance, then an analog value proportional to the distance is reported by microprocessor to the host and used to control a host rate control function, such as scrolling a window, zooming an image, or banking an airplane. A scroll scale factor can adjusts the rate of change of the analog value with respect to penetration of the surface. A directionality parameter defines the surface as engageable from either crossing direction. A specific scroll surface engage speed can be used similarly to the speed of engagement parameter. This is described in greater detail in parent application Ser. No. 08/756,745.

Click surface: Defines properties of click surfaces of the present invention on the sides of the enclosure. This is discussed in greater detail below.

The local microprocessor can also store multiple enclosure sensations simultaneously. In the preferred embodiment, the local processor can only store enclosures that do not overlap each other and it is assumed that all enclosures active on the local processor are at the same level of hierarchy on the host system. In other words, only the top layer of the hierarchy (e.g., only the active window) are provided with enclosure sensations by the local processor. In a more complex embodiment, enclosures could overlap but each enclosure could be downloaded with a hierarchy parameter that indicates which enclosure should be felt by the user in an overlap situation. Other types of host commands can use click surfaces as a parameter as well.

In FIG. 4, the display screen 20 displays a GUI 300, which can, for example, be implemented by a Microsoft Windows® operating system, a Macintosh operating system, X-Windows in Unix; or any other available operating system incorporating a GUI. In the example shown, a window 302 contains a text document 304. Windows like window 302 can also group and display other objects or displays from an application program. A menu bar 308 may be included in window 302 in some GUI embodiments which permits pop-up menus 307 to appear by selecting menu heading targets 310 with a user-controlled graphical object 306, such as a cursor, that is controlled by the user via user object 12. In the subsequent description, the terms "user-controlled graphical object" and "cursor" will be used interchangeably.

The present invention provides "click surfaces" which allow a user to select or initiate a program function while not requiring the user to select a physical input device on the user object 12, such as a button. The click surfaces use force feedback to present the user with a resistant surface that must be moved or depressed to activate the function. For example, force is output in a direction opposite to the movement of the cursor 306 into the click surface to cause the feel of a spring or other resistive element. When the cursor has moved a sufficient distance "into" the click surface, the program function is initiated as if the user had selected a button on the user object 12. This operation is described in greater detail below with regard to the different types of click surfaces presented herein.

Three different types of click surfaces are herein described: an analog button, described with reference to FIGS. 5a–5g; a positive action button, described with reference to FIGS. 6a–6g; and a static selection surface, described with reference to FIGS. 7a–7d and 8. These three types of click surfaces are actually implemented with force feedback in the same way, but are displayed differently in the GUI 300. The visual differences between these types of click surfaces causes users to perceive them as quite unique and different from each other. Examples of these types of click surfaces are described below.

Click surfaces 320 and 322 of the present invention are displayed on the side of window 302. These surfaces function as targets, like other objects in GUI 300, and have appropriate forces associated with them. Click surfaces 320 and 322 also have a command gesture associated with them, such as a physical button press. Thus, by interacting the cursor 306 with click surface 320 or 322, the user can select a program function associated with the selected click surface without having to physically press a button on the interface device 13 or perform some other manual command gesture associated with a physical input device.

In the embodiment shown, click surface 320 can be graphically implemented as any of the types of click surfaces. Click surface 320 can act as a close button for window 302. When the user selects the click surface 320 in the appropriate fashion (described below), the window 302 closes and is removed from GUI 300.

Similarly, click surface 322 can perform a different desired function, such as enlarging window 302 to full size such that it covers the entire screen. Once the window covers the entire screen, click surface 322 can be displayed on the inside of the window 302 border to allow the user to select the previous size of the window 302. Preferably, in the full size window state, click surface 322 is displayed in an "on" state i.e., the surface 322 is displayed at a level lower than the "off" state, as if the click surface 322 were a button that had been pressed down. If click surface were selected again by cursor 306, the click surface "button" would be displayed back in its higher level, unpressed condition to indicate the off state.

In addition, the user can designate desired functions for any specified click surfaces 320 or 322 in some embodiments. Since click surfaces 320 and 322 are part of button objects visually attached to the window 302, the click surfaces 320 and 322 preferably control functions of window 302. Herein, click surfaces may also be referred to as graphical "buttons" since their operation may resemble physical buttons, especially when the click surfaces have two or more states.

Dialog box 330 is another graphical object displayed in GUI 300. Box 330 includes a display area 332 for displaying text, files, etc., and a check box 333 and standard graphical buttons 334 which a user selects with a physical button on the user object 12. In addition, click surfaces 335 and 336 are provided coupled to the edge of dialog box 330. Click surface 335 performs a checking or unchecking of the associated check box 333, depending on the state of the click surface 335 and the check box 333. Each click surface 336 performs the same function as the standard button 334 positioned just above it, except that no physical button need be pushed by the user to initiate the associated function when selecting a click surface 336, as explained below. Other similar click surfaces can be displayed on the edge or inside dialog box 330, and may be associated with other objects or not, as desired.

Icon 340 is another graphical object displayed in GUI 300 and may be associated with a click surface. For a normal icon, the user guides the cursor 306 over the displayed area of the icon 340 and pushes a physical button on user object 12 to initiate the function associated with the icon, which is typically executing an application program associated with the icon (or selecting the icon itself to drag it, show properties of it, etc.). In the present invention, icon 340 can be implemented with one or more click surfaces 342. These operate similarly to the click surfaces 320, 322, and 336. For example, when the static selection surface type of click surface is provided, the click surface can be implemented as one of the displayed surfaces of the graphical object (or target) itself and no separate displayed surface or button shape need be displayed. The click surfaces 342 can be the displayed borders of the icon 342, as shown, or may be invisible surfaces displayed a short distance away from the borders of the icon. This embodiment is described in greater detail with respect to FIG. 8. Other graphical objects in GUI 300 can also incorporate the selection surface type of click surface in the displayed borders of the object, like the described embodiment of icon 340. For example, standard graphical buttons 334, the border of window 302, the sides of pop-up menu 307, the edges of the displayed portion of screen 20, or other objects can be or include click surfaces of the present invention. When the click surface is selected by moving the user object against an opposing force of the click surface, a command gesture is provided to the host computer as if a physical button on mouse or other input device was pressed.

In other embodiments, one side of icon 340 can be provided as a click surface, and another side of the icon can be implemented as a double click surface. If the user selects the click surface, a single click (command gesture signal) is input to the host computer, and the user selects the icon and may then drag it, show its properties, etc. If the user selects the double-click surface of the icon, the host computer receives two clicks, indicating that a program associated with the icon should be immediately executed. Another surface of the icon 340 could be used as a right button click corresponding to pressing the right physical button of the mouse, a middle button click for the middle button of the mouse, etc.

In other embodiments, icon 340 can include the other types of click surfaces in its borders, such as analog buttons and positive actions buttons. For example, one side of icon 340 can be displayed to move inward with the force exerted by the user until the trigger point of the button is reached. Or, the side of icon 340 can be moved to the "on" position only after the trigger point is reached, as for positive action buttons. In yet other embodiments, only a portion of the side of the icon need be moved.

A click surface can also be represented on irregular or curved objects, such as circles, ovals, or other shapes. Preferably, movement normal to the point of contact into the graphical object will activate the click surface once the trigger position is reached. For example, movement towards the center of a circular graphical object can activate a click surface on the circumference of the circle. In some embodiments, a direction of movement into the click surface can select different results or states of the click surface.

In yet other embodiments, click surfaces of the present invention can be provided in a three-dimensional graphical user interface or other graphical environment. For example, if a graphical object is represented as a cube, click surfaces can be provided on any side of the cube. If a graphical object is represented as a sphere, the click surface can be incorporated into the circumference of the sphere. The user can "push" the cursor toward the center of the sphere, and the trigger position (described below) can be positioned at a predetermined point along the radial distance to the center of the sphere. Thus, in a 3-D environment, the user can select or activate a click surface to pick up, move, or otherwise manipulate the associated 3-D object.

Herein, the movement of user object 12 in the local frame 30 is often referred to as movement in the displayed host frame 28. That is, movement of user object 12 in a direction in the local frame 30 has a corresponding movement in the host frame 28. Thus, when the user object 12 is "moved" within GUI 300 and with reference to displayed graphical objects, this relationship with the frames is herein inferred.

Figure 5E:
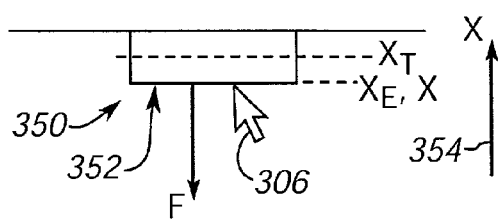
Figure 5G:
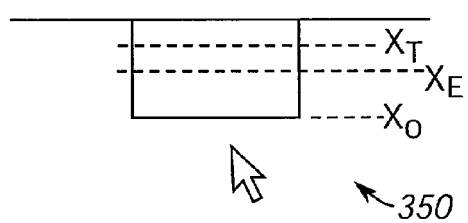
Figure 5F:
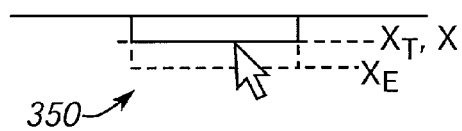

FIGS. 5a–5g illustrate the operation of an analog button type of click surface. FIGS. 5a–5d illustrate the activation or "turning on" the analog button, and FIGS. 5e–5g illustrate the deactivation or "turning off" of the analog button. Of course, in other embodiments, the activation described here can be used to deactivate a button or function, and the deactivation described here can be used to activate a button or function. In yet other embodiments, the analog button may have only one state and be used as more of a "selector" rather than a button having two states. Much of the following detailed description is also applicable to the other click surfaces described herein, except for those properties unique to the analog button (described below).

FIG. 5a illustrates analog button 350 displayed in a deactivated state in GUI 300 or other graphical environment on display screen 20. Cursor 306 is controlled by the user manipulating mouse 12 or other user object. Button portion 371 is a graphical object shown as a rectangular shape and includes a surface 352 which the user is intended to interact with to activate and deactivate the button. In other embodiments, the side surfaces can also be used as click surfaces and act as surface 352. Button portion 371 can also be provided as other shapes or configurations in other embodiments. Analog button 350 may also be attached to another graphical object 353 with which the button 350 is associated, such as window 302 shown in FIG. 4.

When the user moves user object 12 so that cursor 306 moves against surface 352 of the analog button 350, then force is output on the user object 12 in the direction opposing compression of the surface 352. This force is represented as arrow F in FIG. 5a, and feels to the user as if the cursor 306 and the user object 12 have moved against a compliant surface. The designation $X_O$ indicates the position of the surface 352 along the x-axis 354 in the deactivated state, and the designation X indicates the current position of the user object 12 with respect to the x-axis 354 in the host frame that corresponds with the current position of the user object 12 in the local frame 30, where $X=X_O$ in FIG. 5a.

FIG. 5b illustrates cursor 360 being moved "into" the analog button surface 352 in a direction shown by arrow 356. The user moves user object 12 in a direction corresponding to direction 354 to cause this movement. A spring force, designated by arrow F, is output to oppose this motion, where the spring force magnitude is determined as follows:

$$F=k*(X_O-X)- \tag{1}$$

where k is a spring constant, $X_O$ is the original position of the surface 352 in the deactivated state, X is the current position of the user object 12, and F is the resulting spring force magnitude. The force is applied in a direction opposing the movement of the user object from the local "origin," which is the original contact point between the cursor/user object and the surface 352 of the analog button. The force F is thus proportional to the distance between the current position of the user object and the original position of the surface 352. The spring force will thus feel stronger to the user the farther from the position Xo the user object/cursor is moved. In other embodiments, a spring (restoring) force can be modelled with an exponential stiffness or other relationship rather than the linear stiffness of Equation (1). Also, a saturation region can be provided, where the magnitude of force generally remains constant when the user object is moved past a particular distance. In some embodiments, the saturation force magnitude is can be limited to a predetermined percentage of the maximum possible output force in a the selected degree of freedom, so that overlay forces can be overlaid on top of the restoring force sensation.

The magnitude of the restoring force F might be changed in other embodiments by altering the spring constant k. For example, a different k can be used in each of the two states of a button. In other embodiments, k might be varied depending on a different characteristic or condition. For example, k can be proportional to the size of a button or surface. In other embodiments, other types of forces can be provided for click surfaces of the present invention, such as a damping force (dependent on velocity of the user object), a vibration, etc. A friction force might be added to the spring force of equation (1) for further effect, and/or an inertia force. Also one or more overlay forces may be associated with the determined spring force. Overlay forces, also known as "effects", are forces applied to the user object in addition to the restoring force and may be used to provide information to the user or provide some other effect. Overlay forces may include such force sensations as jolts, vibrations, etc.

In the analog button type of click surface, the movement of the user object 12 in direction 354 causes the surface 352 to be displayed as moving with the user object. In addition, cursor 306 is displayed as moving and keeping in contact with the surface 352 as the surface is moved. The display of the cursor and the surface 352 is preferably performed by the host computer 18, while the force F output on the user object 12 is preferably performed by the local microprocessor 200. The coordination between the display and the forces is accomplished with commands sent from the host to the microprocessor and data sent from the microprocessor to the host computer. This provides the user with visual feedback of the cursor 306 moving correspondingly with the user object 12, and the visual engagement with surface 352 that corresponds with the force feedback felt as the spring force.

In one embodiment, the microprocessor can determine when contact between the user object and the click surface is made. For example, the host computer can provide the location and other properties of click surfaces within the graphical environment to the microprocessor beforehand, and the microprocessor independently determines when contact has been made. In a different embodiment, the host computer 18 can detect when a click surface is contacted by the cursor and user object, and can immediately send a command indicating to the microprocessor to implement a click surface at the current position of the user object. These two embodiments are described in greater detail below.

Also, in the preferred embodiment, lateral movement of user object 12 and cursor 306 is limited while the cursor 306 is engaged with the button 350. For example, in FIG. 5b, the user is preferably prevented from moving cursor 306 past the edges 355 of button 350 through the use of obstruction forces that are output on user object 12 (and similarly for the other click surfaces described herein). These forces are applied in the opposite direction to the movement of the cursor that would move the cursor "off the edge" of the button. This is very helpful in assisting the user to keep the cursor 306 engaged with the button and not inadvertently slide the cursor off surface 352. In other embodiments, wall surfaces can be visually displayed to correspond with these side obstruction forces. In yet other embodiments, the side obstruction forces are not provided, especially if the surface 352 is large enough so that the cursor will not easily move off the edge of the button.

In FIG. 5c, the user object 12, cursor 306, and surface 352 have continued movement in direction 356 and have reached a point $X_T$ which is the "trigger position", i.e., the position on the x-axis which causes the button to change state to an activated or "on" state ($X=X_T$). At this point, a change in the force output on the user object is made. Preferably, as the button enters the on state, the force F is changed to depend on the following relationship:

$$F=k*(X_E-X) \tag{2}$$

where k is the spring constant, X is the current position of the user object 12, and $X_E$ is the "engaged position" of the button, i.e., the position at which surface 352 of the button will be displayed when the button is in the on state (as described below with respect to FIGS. 5e–5g). Thus, the force F will change from being based on the current position with reference to the deactivated position $X_O$, to being based on the current position with reference to the activated position $X_E$. Since the position $X_E$ is in the negative (down) direction from the trigger position $X_T$, the user will feel an immediate change in force on user object 12 when the trigger position has been attained as shown in FIG. 5c. This change in force feels like a "pop" to the user, and this feeling is preferably enhanced by a large force spike in the present invention. This force spike is, for example, an unstable but momentary pulse of force, and output in any direction. The force spike serves to accentuate the haptic cue to the user that the button has been activated and is now in the on state. Of course, the user may continue to move user object 12 past point $X_T$ if he or she desires, but the force is now based on equation (2).

Once the surface 352 has been moved to the trigger position, the interface device 14 sends a signal to the host computer indicating that a command gesture or "click" has been made by the user with reference to graphical object 354, which in non-click-surface embodiments would be caused by the user pressing a physical button.

FIG. 5d illustrates analog button 350 after cursor 306 has been withdrawn from surface 352 and the surface 352 has visually moved from the trigger position $X_T$ to the engaged position $X_E$. If the cursor 306 is kept in contact with surface 352 during this movement, the user would feel the spring force on user object 12 based on equation (2) (the user may even be able to hold the surface and prevent it from reaching position $X_E$ by keeping the cursor in the way). In another embodiment, the surface 352 can automatically be moved to position $X_E$ while the cursor is redisplayed to a position just beyond the surface 352 and out of contact with it, while the forces on user object 12 are removed. The surface 354 stays at the engaged position $X_E$ until the user desires to move the button back to the disengaged state, as described with reference to FIGS. 5e–5g.

In other embodiments, $X_E$ can be at the same position on the X-axis 354 as $X_T$, or $X_E$ can be further from Xo than $X_T$ in direction 356.

FIG. 5e illustrates analog button 350 in an engaged, activated, or "on" state, where surface 352 of the button is positioned at position $X_E$ on x-axis 354. Once the user decides that he or she wishes to change the button to the deactivated state, the user moves cursor 306 to contact the surface 352 of the button 350. The user then feels the force F opposing motion into the surface of the button, where F is based on equation (2) presented above.

FIG. 5f illustrates the user moving user object 12 and cursor 306 such that the current position X of the user object 12 is at the trigger position $X_T$. In the analog button type of click surface, the surface 352 and cursor 306 are visually moved on display screen 20 in conjunction with the corresponding motion of user object 12 along axis 354. In FIG. 5f, the user object has been moved to the trigger position, thus causing the button to switch to an off or deactivated state. The force output on the user object 12 then changes from being based on equation (2) to being based on equation (1), presented above. This feels to the user like a "pop" or jolt, which is preferably accentuated by a force spike similar to the activation force spike described above. Thus the user is informed of the deactivation of the button through the forces output on the user object 12. A command gesture is signaled to the host computer at this time, as in FIG. 5c above.

FIG. 5g illustrates analog button 350 in a deactivated or off state, where the surface 352 has visually moved from the trigger position $X_T$, past the engaged position $X_E$, and is positioned at the original deactivated position $X_O$, where the surface 352 continues to be displayed until the user wishes to again change the button state. Similar to the motion after engagement of the button, the user will feel force F based on equation (1) on the user object 12 if cursor 306 is held in engagement with surface 352 after the deactivation of the button; or the button can automatically pop back to position Xo while the cursor is redisplayed out of its way, as explained above.

Figure 6A:
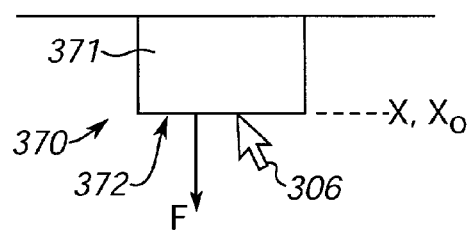
FIGS. 6a–6g are diagrammatic illustrations of a positive action button embodiment of the click surface of the present invention.
Figure 6C:
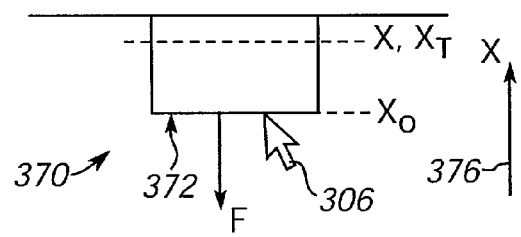
Figure 6B:
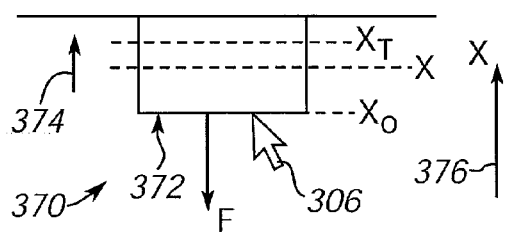
Figure 6D:
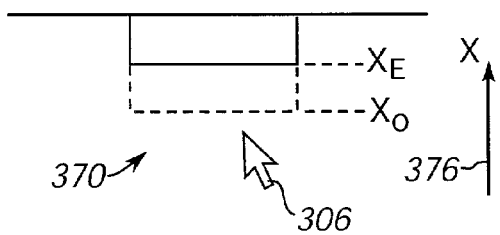
Figure 6E:
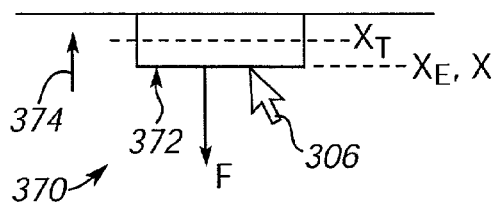
Figure 6G:
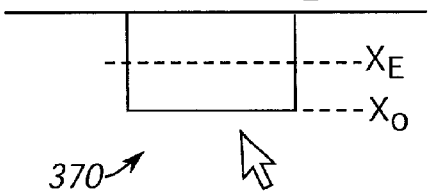
Figure 6F:
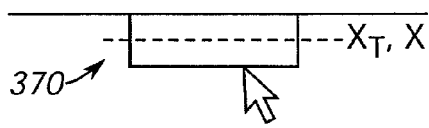

FIGS. 6a–6g illustrate the operation of a positive action button type of click surface. FIGS. 6a–6d illustrate the activation or "turning on" of the positive action button, and FIGS. 6e–6g illustrate the deactivation or "turning off" of the positive action button. Of course, in other embodiments, the activation described here can be used to deactivate a button or function, and the deactivation described here can be used to activate a button or function.

FIG. 6a illustrates positive action button 370 displayed in a deactivated state in GUI 300 or other graphical environment on display screen 20. Cursor 306 is controlled by the user manipulating user object 12, as explained above, and has been moved to contact surface 372 of the positive action button 370. The position of surface 372 in the button's deactivated state is shown as position Xo, and the current position of the user object 12 as it corresponds to the displayed host frame 28 is shown as position X. Position X is at position Xo in FIG. 6a.

As in the analog button embodiment described above, a force is output on the user object in the direction opposite to the wall, shown as arrow F. This force is preferably a spring force and is determined from equation (1) presented above. Other types or magnitudes of forces can also be output in other embodiments (damping force, vibration, texture, jolt, etc.).

In FIG. 6b, the user has moved the user object 12 in a direction corresponding to direction 374 on the display screen along x-axis 376. The current position of the user object 12 is indicated as dashed line X. In the positive action button embodiment, the surface 372 of the button does not move with the user object; thus, surface 372 continues to be displayed at position Xo. Likewise, cursor 306 remains displayed at the surface 372 at position Xo during the movement of the user object in direction 374. During this movement, the force F continues to be output on the user object 12 as in FIG. 6a. Thus, the user receives haptic feedback that the button is being pushed, but receives no visual feedback in the form of a moving button. This breaking of the mapping between the position of the cursor 306 and the user object 12 provides the user with the illusion that surface 352 is immovable; since users are quite influenced by their visual sense, the user sees the cursor and surface 372 remaining in one position and believes that the force experienced is a rigid wall force that does not allow them any movement into it. This breaking of the mapping is described in greater detail in patent application Ser. No. 08/664,086, incorporated by reference herein.

FIG. 6c illustrates the user object 12 having a current position of X at the trigger position $X_T$ on the x-axis, i.e., the user object 12 has been moved and has reached the trigger position $X_T$. The surface 372 is still displayed at position Xo until position $X_T$ is reached by the user object, as explained below. At point $X_T$, the force F output on the user object 12 changes from that of equation (1), based on the position Xo, to the force based on equation (2), based on position $X_E$. This explained in greater detail with respect to FIGS. 5a–5d. As with the analog button embodiment, the transition to the force of equation (2) is felt as a small pop, and is enhanced with a force spike to allow the user to more easily feel the trigger position. A command gesture is sent to the host computer once the surface 372 reaches position $X_T$.

In FIG. 6d, the user object 12 has just reached position $X_T$ and has been moved back away from button 370. Surface 372 has been redisplayed at engaged position $X_E$, which is a position between $X_T$ and Xo, and indicates that the positive action button is in the activated or on state. In one embodiment, as the surface 372 is redisplayed at the engaged position, the cursor 306 is redisplayed just beyond (out of contact with) the new engaged position and all forces on the user object are removed; the button thus pops the cursor away. In another embodiment, the surface might only be displayed at position $X_E$ after the cursor moves out of the way, or if the user does not exert opposing force on the surface. Thus, the user receives visual feedback that the button has been activated only after the trigger position $X_T$ has been reached by the user object 12. While not as intuitive as the analog button which displays the surface 352 at the current position of the user object, the positive action button is less computationally intensive for the host microprocessor 180 since the button has only two displayed states.

FIGS. 6e–6g illustrate the deactivation of a positive action button, i.e., the process of turning off the button. In FIG. 6e, the user moves user object 12 and cursor 306 against surface 372 of the button. The force F experienced by the user object 12 is based on equation (2) presented above.

FIG. 6f illustrates the user moving the user object in direction 374. As with the activation of button 370, the surface 372 and cursor 306 are not moved in conjunction with the user object, and a force F based on equation (2) is output from the user object. Again, the breaking of this mapping provides the user with the illusion that the surface 372 is a hard, immobile surface. In FIG. 6f, the user object's current position, indicated as X, reaches the trigger position $X_T$, which is preferably the same trigger position as for the deactivation shown in FIGS. 6a–6d and has the same effect. In other embodiments, different trigger positions for activation and for deactivation of a click surface can be provided.

In FIG. 6g, after the trigger position $X_T$ has been reached as shown in FIG. 6f, the surface 372 is redrawn at the disengaged or off position Xo similarly as it was redrawn at position $X_E$ in the activation process. Cursor 306 resumes tracking its position corresponding to the position of user object 12, which has been moved away from the button 370 in FIG. 6g. The button can be re-activated by moving the cursor 306 against surface 372, as described with reference to FIGS. 6a–6d.

FIGS. 7a–7d illustrate the operation of a static selection surface type of click surface. This type of click surface requires no visual updates at all on display screen 20 and is thus useful for use with existing graphical objects in GUI without having to implement new graphical images or animations for those objects. The displaying functions are preferably handled by the host computer 18, while the force feedback functions are handled preferably by the local microprocessor 200; thus, the host has less of a processing burden using static selection surfaces.

Figure 7A:
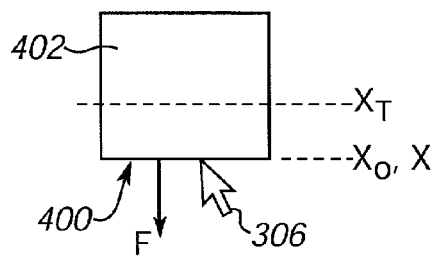
FIGS. 7a–7d are diagrammatic illustrations of a static selection surface embodiment of the click surface of the present invention.

FIG. 7a illustrates a static selection surface 400 which can be made part of an existing graphical object 402 or can be part of a special graphical object 402 that specifically provides selection surface 400. Any other surfaces of the object 402 can be implemented as static selection surfaces also, if desired. As shown, the button is in a deactivated or off state. For static selection surfaces, there is no specific way for the user to determine whether the selection surface is in an on state or an off state; thus, in the preferred embodiment, other indicators can provide this information, such as a color of the object, a sound when contacting the object, etc. In other embodiments, the selection surface may have only one state and is used to select the graphical object. In FIG. 7a, the user has moved user object 12 and cursor 306 against surface 400. A force F is applied to the user object in the direction shown and based on equation (1) above, similar to force F in FIGS. 5a–5g and 6a–6g above.

Figure 7D:
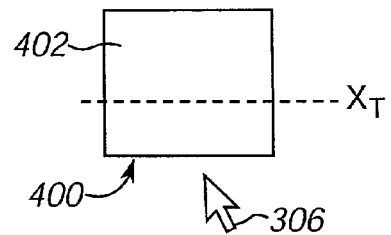
Figure 7B:
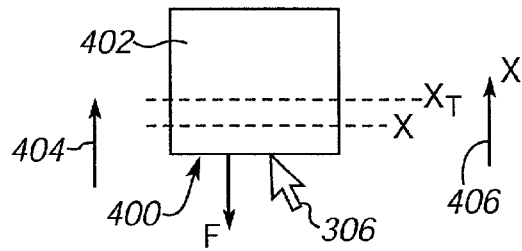

FIG. 7b illustrates user object 12 being moved in direction 404 along x-axis 406. The current position of the user object 12 on the x-axis is shown as position X. As with the positive action button in FIG. 6b, the cursor 306 and the surface 400 are displayed at Xo, unchanged from the time of first contact of cursor 306 and surface 400. Thus, the mapping between the cursor 306 and the user object 12 is broken as described with reference to FIG. 6 above. The force F is continually output on the user object 12 as the user object is moved in direction 404.

Figure 7C:
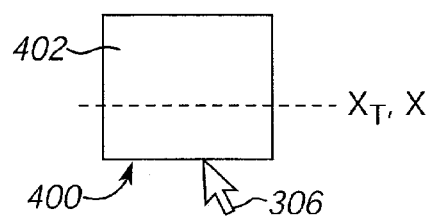

In FIG. 7c, the user object 12 has been moved to the trigger position $X_T$. As in the buttons described above, this causes the button to go into the on or activated state. However, unlike the analog button and positive action button, the force F on the user object does not change at this point. Since there is no engaged position $X_E$ for the selection surface 400, equation (2) is not used, and the force F is always determined based on the current user object position with reference to the surface 400 at position Xo. Preferably, a force spike or other force signal is output on the user object 12 to cue the user that a change of button state has occurred. In addition, a command gesture is sent to the host computer 18.

As shown in FIG. 7d, the surface 400 is displayed at Xo even when the button has changed state to the on state. The user knows the button state has changed based on the force spike output when the user object 12 was at the trigger position $X_T$ (also, other indicators such as color of the button can be displayed to indicate the change in state).

The process of changing selection surface 400 back to the off state is similar to the process described in FIGS. 7a–7d. Since the surface 400 is not moved, there is no displayed difference between the engaged state and the disengaged state.

In alternate embodiments, an invisible engaged position $X_E$ can be provided for selection surface 400. This would cause the force F to be determined differently depending on the state of the button as determined by equations (1) and (2). Also, different types of force can be output depending on the state of the button to provide haptic information on current button state. For example, a spring force can be output when the user changes the off state to the on state, and texture/spring force (i.e. the feel of bumps combined with a spring) can be provided when the user changes the on state to the off state.

Figure 8:
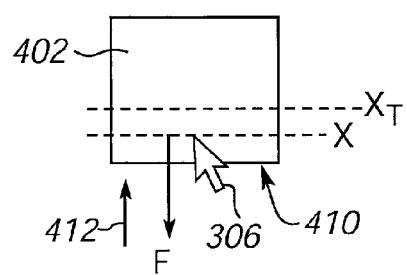
FIG. 8 is a diagrammatic illustration of an alternate embodiment of the static selection surface of FIGS. 7a–7d.

FIG. 8 is diagrammatic illustration showing an alternate embodiment 410 of static selection surface 400 in which the mapping between cursor 306 and the position of the user object 12 is not broken. After the initial contact between cursor 306 and surface 410, the user moves the user object 12 in a direction shown by arrow 412. The current position of the user object 12 is shown by dashed line X. The cursor 306 is also displayed at dashed line X, since the cursor 306 continues to be displayed at the position of the user object 12 in this embodiment. The surface 410, however, remains at the original position Xo. The force F is output on the user object during this movement as described in the embodiment of FIG. 7. When the user object 12 and cursor 306 reach trigger position $X_T$, the button state changes (or the object 402 is selected, see below) as described above. Again, the user preferably feels a force spike or other cue on the user object 12 at the trigger position $X_T$ to indicate the change in state.

The embodiment of FIG. 8 can be used to provide the user with visual feedback as to the actual position of the user object 12 with respect to the surface 410 and graphical object 402. This embodiment might be used where graphical object 402 is an icon or similar object in a GUI 300. Normally, when the user selects an icon in a non-force-feedback GUI, the cursor 306 is guided over the icon at which point the user presses a physical button to select the icon or a function. The embodiment of FIG. 8 is similar to such a case, where cursor 306 is displayed over the object 402 but the user manipulates the spring force of the force feedback to select the icon instead of pressing a physical button. Such an embodiment is well suited to an object 402 having selection surfaces 410 provided on all displayed sides of the object, thus allowing a user to conveniently select the selection surface when approaching the object with the cursor from any direction.

In addition, for either of the embodiments of FIGS. 7 and 8, a static selection surface 400 or 410 may be invisible to the user and displayed, for example, a predetermined distance away from the displayed borders of the graphical object 402. For example, the force F may be output on the user object when the cursor 306 first encounters the invisible click surface. If the user object 12 continues to be moved toward the object 402, a trigger position $X_T$ will eventually be reached, as described above, which will select the graphical object or change the state of a graphical button. The displayed border of the graphical object can be provided as a visible trigger position $X_T$ in such an embodiment, if desired.

With respect to all the click surfaces of the present invention, in one embodiment, the user may change the state of a button twice without disengaging the cursor 306 from the surface 352, thus causing the button to be in its original state before the user changed it. However, if the user wishes to change the button state after changing it twice, the cursor 306 must preferably be moved out of contact with surface 352 and then re-contacted. This prevents the user from accidentally selecting the click surface twice. An exception to this is that the cursor is considered out of contact with surface 352 by being positioned just beyond position $X_E$ when the button is in the on position, even when the surface is not displayed at $X_E$ (as in the selection surface embodiments of FIGS. 7a–7d and 8). In other embodiments, the user may freely change the state of the button without moving cursor 306 out of contact with the activating surface of the graphical object.

It should also be noted that the described on and off "states" of the click surfaces of the present invention need not be implemented. Instead, the click surface might only be able to be selected by a user, i.e., not be a toggling button. For example, when selecting an icon normally with a "double-click" of a physical mouse button, there is no on or off state of the icon which must be determined; the click just selects the icon. Likewise, the click surfaces can be used to simply select a graphical object or a function associated with the click surface rather than changing a state of a button. Herein, the term "selecting" refers to both toggling a button type of click surface as well as selecting a selection type of click surface.

Similarly, any of the above click surfaces can also be implemented with more than two states. For example, the click surface might sequentially select the next state in a sequence of multiple states each time the click surface is selected by the user.

The click surfaces of the present invention are well suited to the dual processor configuration of microprocessor 200 and host computer 18 described with reference to FIG. 3. The host computer preferably handles the display of objects of images on the display screen, while the microprocessor handles the output of forces during click surface interaction. As explained above, in one embodiment, the host may be used to indicate to the microprocessor when the cursor has encountered a click surface and thus signals the microprocessor to begin the output of click surface forces. For those buttons that require little or no update on the display screen (e.g., the positive action buttons and static selection surfaces), the host would only need to provide this indication and would not need to update the button during the click surface engagement (for static selection surfaces). The computational burden on the host is thus effectively reduced.

Likewise, the use of local microprocessor 200 substantially reduces the computational burden on the host 18 when the mapping between cursor 306 and user object 12 is broken in the positive action button and static selection surface embodiments described above. The local microprocessor 200 can "clip" position data to the host so that the break in mapping is invisible to the host. Since the local processor reports user object positions to the host, the local processor can "clip" the position data for the user object 12 when the mapping is to be broken, i.e., the microprocessor 200 does not report the position data in the direction perpendicular to the click surface to the host during movement of the user object into the surface (lateral movement and movement away from the click surface are still reported). From the host computer's point of view, no movement of the user object into the click surface has been detected, so the cursor 306 is displayed at its original contact position with the unmoving click surface. The host computer does not have to keep track of a visual-physical dichotomy, since it simply does not receive user object movement data when the dichotomy is in operation.

As mentioned above, two embodiments can be provided for coordinating the host's display of the graphical environment, including click surfaces and cursor, with the local processor's control of output forces. In one embodiment, the host computer 18 can detect when a click surface is contacted by the cursor. Since the host is already determining collisions and interactions between the cursor and other graphical objects in the graphical environment, the host can also detect contact between the cursor and click surfaces using position data of the user object reported by the microprocessor. When a click surface is contacted by the cursor/user object, the host can immediately send a command indicating to the microprocessor to implement a click surface at the current position of the user object and output forces accordingly. The host also preferably sends any required or desired properties or parameters of the click surface to the microprocessor in a command. For example, the microprocessor needs to know the direction and orientation of the click surface with respect to the cursor so that forces can be output with the proper direction and magnitude. The host can also send the microprocessor any particular information characterizing the click surface; possible parameters for describing a click surface are provided below. Thus, in this embodiment, the microprocessor 200 does not need to determine when a click surface is engaged nor needs to know the location of the click surface (just its current direction and orientation with respect to the cursor). The microprocessor would simply provide output forces and could report command gestures when the trigger position of the click surface is reached.

In a different embodiment, the microprocessor can independently determine when contact between the user object and the click surface has occurred. For example, the host computer can provide the location of click surfaces within the graphical environment to the microprocessor before any interactions take place, and the microprocessor can store these locations in memory 204 (like the graphical object "layout" described above). The commands from the host to the microprocessor can include location and other properties of the click surfaces, as detailed below. Later, during user object movement, the microprocessor can consult the stored locations of the click surfaces and the current position of the user object to determine when the user object makes contact with a click surface. The microprocessor then provides the output forces and reports user object position according to the stored properties of the click surface. The host, meanwhile, simply displays the cursor at positions reported by the microprocessor, and also may act on any command gestures sent by the microprocessor when the user object is at or past the trigger position.

In both these embodiments, the host computer can be ignorant of the forces output on the user object and the method used for selecting the graphical object associated with the click surface. For example, when the user object reaches the trigger position $X_T$, the microprocessor 200 need only report to the host that a physical button has been pressed by the user (a "click", "double click" or any other number of clicks can be reported to the host, depending on the function desired). Thus, the host thinks that the graphical object was selected using a physical button, and acts accordingly. This type of implementation requires no special software for the host to check for the trigger position $X_T$; the microprocessor 200 handles all such tasks. If no local microprocessor 200 is used, then the host computer 18 directly keeps track of positions of the user object and the cursor and must determine when to break the mapping between user object and cursor.

If the click surface is to be used as a parameter in a host command sent to the local microprocessor 200, or as a host command itself, then it may be defined with parameters in the command, similarly to the scroll surface parameters in the enclosure command described above. For example, parameters for a click surface can include a Style parameter to specify the type of click surface desired (analog button, positive action button, or static selection surface). A Directionality parameter, either unidirectional or bidirectional, can define the directions of engageability of the click surface (one side or both sides). A location parameter can define the location of the click surface in the graphical environment. Other parameters can define the location of the trigger position and engaged position of the click surface. A Click Engage Speed parameter can be used to define a cursor speed threshold below which the click surface is engageable. Other parameters can define the force relationships/equations governing determination of forces for the click surface, the current direction and orientation of the click surface with respect to the current location of the cursor, edge forces of the click surface which resist the cursor from slipping off the surface, and whether the click surface provides a click or a double click.

Figure 9:
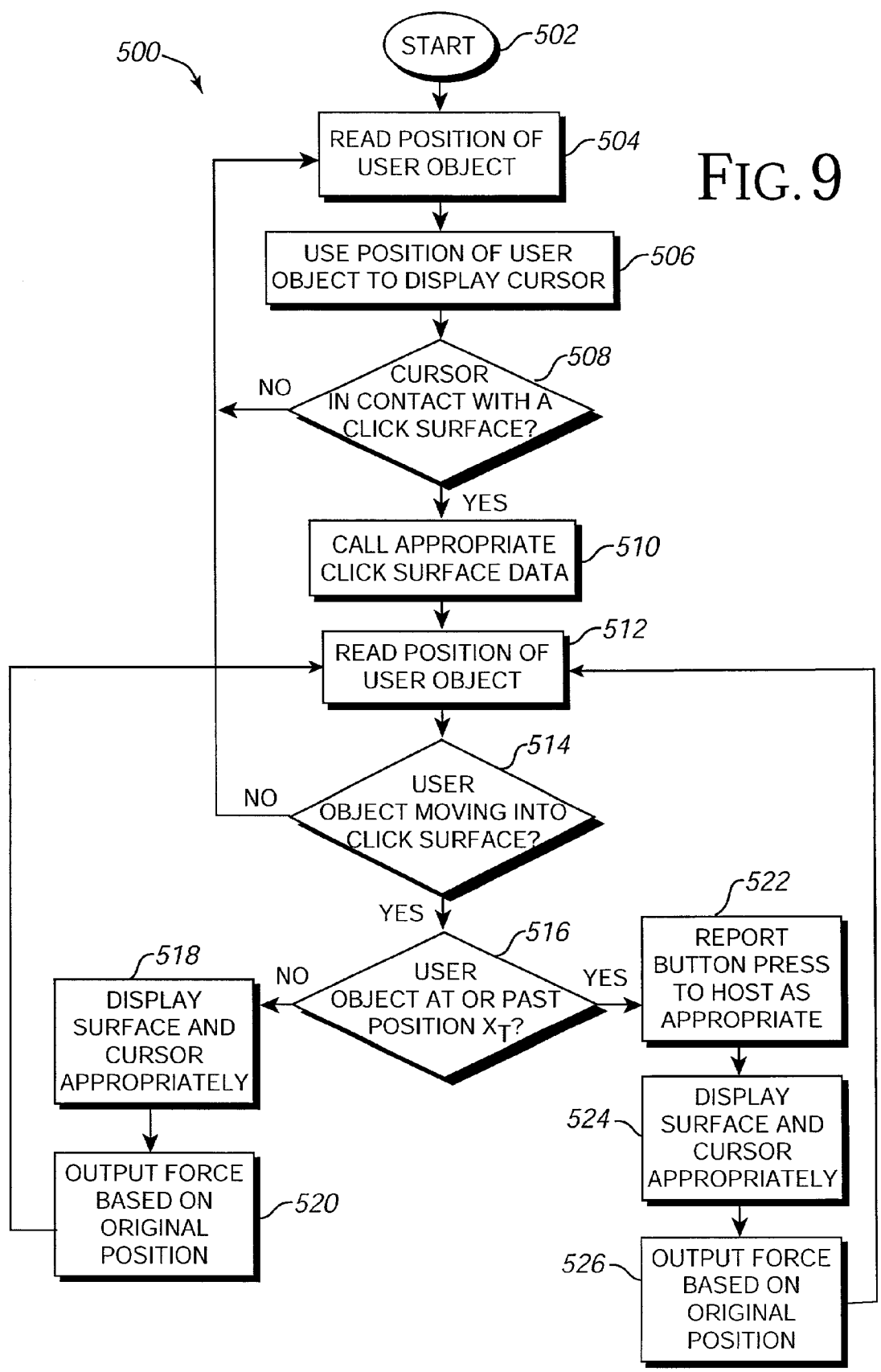
FIG. 9 is a flow diagram illustrating a method of the present invention for providing force feedback click surfaces.

FIG. 9 is a flow diagram illustrating a process 500 of providing click surface of the present invention. The process begins at 502, and in a step 504, the position of the user object is sensed. Depending on the embodiment, either the host computer 18 or the local microprocessor 200 performs the reading of the sensors. In one preferred embodiment, the microprocessor 200 reads the sensors and may convert the sensor data to values which are more appropriate for the host computer 18 to manipulate with reference to the GUI.

In step 506, the display of cursor 306 (or other user-controlled graphical object) on display screen 20 or other display device is updated according to the position of the user object sensed in step 504, if applicable to the embodiment. This step assumes that a normal isotonic (position control) mode that displays the cursor 306 in a position corresponding to user object position is being implemented. Of course, other effects can be provided to display the cursor differently, depending on the programmer's or user's desired effect of the interaction between experienced forces and perceived visual images.

In step 508, the process checks whether the cursor 306 is in contact with a click surface of the present invention. This click surface can be any of the three types described above. This contact typically occurs when the tip or other designated portion of cursor 306 is adjacent to pixels of the displayed surface. In other embodiments, this contact can be defined differently, as for example, a range, contact when other conditions apply, etc. In one embodiment, microprocessor 200 checks this condition from sensor data and stored locations of the click surfaces; in another embodiment, the host computer checks for the contact.

If no contact between cursor and click surface is detected, then the process returns to step 502 to read the position of the user object. If contact is detected, then in step 510, the appropriate click surface data is accessed from memory that describes the parameters of the click surface. For example, parameters may include the distance along the x-axis between positions Xo and $X_T$, between positions Xo and $X_E$, the particular force relationships (such as equations (1) and (2)) used for different states, a flag indicating whether to break the mapping between cursor and user object (as for the different embodiments of FIGS. 7 and 8), tolerances delays before force effects or button selections are implemented, and others as described above. In one embodiment, the microprocessor 200 can retrieve such characteristics from local memory 204; for example, these parameters or characteristics were previously conveyed to the microprocessor from the host computer across a communication interface. Alternatively, the host can send these characteristics to the microprocessor in a command at the present time.

In step 512, the user object position is again sensed, as in step 502. In step 514, the process checks whether the user object 12 is moving into the contacted click surface based on previous position data and current position data. If not, for example when the user object moves away from the surface, then the process returns to step 502. In some embodiments, the user may move the cursor away from the surface, and the surface will "follow" the cursor as it springs back to position $X_E$ or Xo; the user in some embodiments can feel the "push" of the surface from such an effect. The force from such an effect can be determined using the same relationship as for the force F provided in step 520 below.

If the user object is moving into the click surface, then in step 516, the process checks whether the user object has reached the trigger position $X_T$ of the click surface. If not, the process continues to step 518, where the click surface and the cursor 306 are displayed appropriate to the particular embodiment. For example, if an analog button is used, then the surface and the cursor are both updated and displayed with the position of the user object. In the preferred embodiment, this requires that the microprocessor 200 report the position of the user object normally, so that the host computer can update the surface and the cursor on the display. If an appropriate embodiment of a positive action button or a static selection surface is used, then neither the surface nor the cursor would be updated on the display screen in step 518. In the preferred microprocessor embodiment, then, the microprocessor need not report any of the positions of the user object as it moves into the surface to the host (clipping), since the host does not have to update the screen.

After step 518, the process continues to step 520, in which a force F is output on the user object based on the original position of the surface, i.e., the magnitude of force is proportional to the displacement from the original position. For example, this original position might be position Xo if the button is being activated, or it might be position $X_E$ if the button is being deactivated. One example of such a force is presented in equations (1) and (2) above. In other embodiments, arbitrary forces not based on the original position can be output. Preferably, the microprocessor 200 keeps track of the distance between the current position and the original position of the surface and determines the appropriate force. The process then returns to step 512 to sense the position of the user object.

If the user object has reached the trigger position $X_T$ of the click surface in step 516 (or has moved past $X_T$), then the process continues to step 522, in which (in the preferred microprocessor embodiment), the microprocessor reports data representing one or more "clicks" or command gestures to the host computer. This click data is preferably identical to the click data that the host would receive if a physical button on the mouse had been pressed; the host is thus fooled into thinking such a physical button has been pressed. Thus, as shown in FIG. 4, if the click surface 320 corresponding to the close button of the window 302 is pressed, the host receives a "click" signal once the user object moves to the trigger position. If the user selects the click surface 335 corresponding to check box 333, the host receives a "click" signal which causes the host to check the box (on state) once the surface 335 gets to the trigger position. If the user selects the trigger position of icon 340, the host computer receives a double click signal (two clicks in typically rapid succession) indicating that the user wishes to execute a program associated with the icon. If no microprocessor 200 is used, then the host itself determines whether a trigger position indicates a click, double click, etc.

In next step 524, the click surface and the cursor are displayed appropriate to the type of click surface implemented. For example, when using an analog button, the click surface is displayed moving from the position $X_T$ toward the position $X_E$ or Xo and the cursor 306 is displayed at the corresponding position of the user object 12 (and may be redisplayed away from the click surface as described above). When using a positive action button, the click surface is displayed at the new position $X_E$ or Xo (unless, in some embodiments, the user object is in the way) and the cursor is displayed at the user object position. When using a static selection surface, the click surface is always displayed at the original position, and the cursor is displayed at the user object position (unless, in some embodiments, the user object is still within the borders of the graphical object).

In next step 526, forces are output on the user object. Preferably, a force spike is output to indicate to the user that the trigger position has been selected, as explained above. In addition, a force based on the new position of the button, whether it is Xo or $X_E$, is determined and output. For static selection surfaces, the new position of the button is the same as the old one, so only the force spike tells the user of the trigger position. Of course, in other embodiments, other types and magnitudes of forces can be output. Preferably, the microprocessor 200 keeps track of the distance between the current position and the new position of the surface and determines the appropriate force. The process then returns to step 512 to read the user object position.

In alternate embodiments, the click surfaces can be totally host computer controlled, so that the host keeps track of all positions, determines forces, and reads sensors directly. However, the microprocessor 200 embodiment is preferred since the microprocessor's handling of many of these tasks allows the host computer to perform other tasks more quickly.

It should be noted that some of the various steps can be performed substantially simultaneously, particularly the host display of the cursor and other graphics and the microprocessor's outputting of forces. For example, steps 518 and 520 are preferably simultaneous, as well as steps 522, 524, and 526.

While this invention has been described in terms of several preferred embodiments, it is contemplated that alterations, permutations and equivalents thereof will become apparent to those skilled in the art upon a reading of the specification and study of the drawings. For example, many different types of forces can be applied to the user object 12 in accordance with different types of click surfaces, different states of the click surface, and different functions associated with the click surface. Also, many varieties of graphical objects in a GUI can be associated with click surfaces, and many other types of computer and graphical environments can make use of the click surfaces disclosed herein. In addition, many types of user objects and mechanisms can be provided to transmit the forces to the user, such as a joystick, a mouse, a trackball, a stylus, or other objects. Furthermore, certain terminology has been used for the purposes of descriptive clarity, and not to limit the present invention. It is therefore intended that the following appended claims include all such alterations, permutations, and equivalents as fall within the true spirit and scope of the present invention.

What is claimed is:

1. A method comprising:
updating a display of a cursor within a graphical user interface using sensor information received from an interface device, the sensor information representing motion of at least a portion of the interface device;
detecting a speed of the cursor when the cursor engages the graphical target; and
outputting a tactile sensation based upon the speed of the cursor when the cursor engages the graphical target.

2. The method of claim 1 wherein the outputting a tactile sensation occurs only if the detected speed of engagement is below a predetermined threshold speed, a tactile sensation will be output to the user.

3. The method of claim 2 wherein the detected speed is compared with a plurality of threshold speeds, the plurality of threshold speeds being associated with a plurality of tactile sensations, the output tactile sensation being from the plurality of tactile sensations.

4. The method of claim 1 wherein the detecting further includes determining when the cursor has moved to or past a trigger location positioned in the graphical target.

5. The method of claim 4 further comprising selecting a function within the graphical user interface when the cursor has moved to or past the trigger location.

6. The method of claim 5 wherein the selecting only is performed when the speed of the cursor is below a predetermined threshold speed.

7. The method of claim 1 wherein the graphical target is a menu element displayed in the graphical environment.

8. The method of claim 1 wherein the graphical target is a graphical button.

9. The method of claim 1 further comprising changing at least one displayed characteristic of the graphical target to indicate that the function has been selected.

10. The method of claim 1 wherein the tactile sensation includes a force on the interface device.

11. The method of claim 1 wherein the tactile sensation includes one or more of a vibration, a texture, and a jolt.

12. A method comprising:
displaying a cursor within a graphical user interface using sensor information received from an interface device, the sensor information being associated with motion of at least a portion of the interface device;

outputting a tactile feedback command to be provided to the interface device to cause a tactile sensation when the cursor engages the graphical target;

detecting whether the cursor has moved to or past a trigger location in the graphical target;

selecting a function within a graphical user interface when the cursor has moved to or past the trigger location; and modifying the tactile sensation, the modifying being associated with the selecting of the function.

13. The method of claim 12 wherein the cursor is determined to have moved to the trigger location when the cursor has moved a predetermined distance past a point of engagement.

14. The method of claim 12 wherein the graphical target is modified visually when the cursor reaches the trigger location.

15. The method of claim 12 wherein the graphical target is a menu element displayed in the graphical user interface.

16. The method of claim 12 wherein the graphical target is a graphical button displayed in the graphical user interface.

17. The method of claim 12 further comprising:
changing at least one displayed characteristic of the graphical target to indicate that the function has been selected.

18. The method of claim 12 wherein the output tactile sensation includes a force on the interface device.

19. The method of claim 12 wherein the output tactile sensation includes at least one of a vibration, a texture, and a jolt.

20. The method of claim 12, wherein the graphical target is a static selection surface, the cursor being displayed at an original position of engagement while the at least a portion of the interface device moves in a direction corresponding to a direction into the graphical target.

21. A program storage device readable by a machine, said device embodying a program of instructions executable by the machine to perform a method comprising:

updating a display of a cursor within a graphical user interface using sensor information received from an interface device, the sensor information being associated with motion of at least a portion of the interface device;

outputting a tactile sensation when the cursor engages the graphical target;

detecting whether the cursor has moved to or past a trigger location in the graphical target;

selecting a function within the graphical user interface when the cursor has moved to or past the trigger location; and modifying the tactile sensation in response to the function being selected.

* * * * *